United States Patent
Komninakis et al.

(10) Patent No.: US 8,290,100 B2
(45) Date of Patent: Oct. 16, 2012

(54) INTERFERENCE DETECTION AND MITIGATION

(75) Inventors: Christos Komninakis, La Jolla, CA (US); Daniel F. Filipovic, Solana Beach, CA (US)

(73) Assignee: Qualcomm Incorporated, San Diego, CA (US)

( * ) Notice: Subject to any disclaimer, the term of this patent is extended or adjusted under 35 U.S.C. 154(b) by 628 days.

(21) Appl. No.: 12/330,798

(22) Filed: Dec. 9, 2008

(65) Prior Publication Data

US 2009/0086863 A1    Apr. 2, 2009

Related U.S. Application Data

(63) Continuation-in-part of application No. 11/693,968, filed on Mar. 30, 2007, now Pat. No. 7,876,867.

(60) Provisional application No. 61/018,572, filed on Jan. 2, 2008, provisional application No. 60/836,608, filed on Aug. 8, 2006.

(51) Int. Cl.
*H03D 1/04* (2006.01)

(52) U.S. Cl. ........ 375/346; 329/318; 329/319; 329/320; 324/76.23; 331/42; 331/43; 455/189.1; 455/293

(58) Field of Classification Search .................. None
See application file for complete search history.

(56) References Cited

U.S. PATENT DOCUMENTS

| | | | |
|---|---|---|---|
| 4,085,368 A | 4/1978 | Yeh | |
| 5,093,637 A | 3/1992 | Isota et al. | |
| 5,749,051 A | 5/1998 | Dent | |
| 6,009,129 A | 12/1999 | Kenney et al. | |
| 6,018,317 A | 1/2000 | Dogan et al. | |
| 6,194,942 B1 | 2/2001 | Yu et al. | |
| 6,266,517 B1 | 7/2001 | Fitzpatrick et al. | |
| 6,393,011 B1 | 5/2002 | Kim | |
| 6,639,541 B1 | 10/2003 | Quintana et al. | |
| 6,646,449 B2 | 11/2003 | Seppinen et al. | |
| 6,873,832 B2 | 3/2005 | Shi | |
| 7,046,972 B2 | 5/2006 | Matsuyoshi et al. | |
| 7,127,211 B2 | 10/2006 | Hildebrand et al. | |

(Continued)

FOREIGN PATENT DOCUMENTS

FR    2898746 A1    9/2007

(Continued)

OTHER PUBLICATIONS

International Search Report and Written Opinion—PCT/US2008/088260, International Search Authority—European Patent Office—Jun. 17, 2009.

(Continued)

*Primary Examiner* — David C. Payne
*Assistant Examiner* — Adolf Dsouza
(74) *Attorney, Agent, or Firm* — Eric Ho

(57) ABSTRACT

Techniques for detecting and mitigating interference are described. A device (e.g., a cellular phone) senses interference levels and digitally reconstructs the expected interference in the received signal. The device may correlate the reconstructed interference with the received signal and determine interference in the received signal based on correlation results. The device may adjust the operation of one or more circuit blocks (e.g., a mixer, an LNA, etc.) in a receiver based on the detected interference in the received signal. Alternatively or additionally, the device may condition the digital interference to obtain conditioned reconstructed interference matching the interference in the received signal and may then subtract the conditioned interference from the received signal.

31 Claims, 27 Drawing Sheets

U.S. PATENT DOCUMENTS

| | | |
|---|---|---|
| 7,209,528 B2 | 4/2007 | Prater |
| 7,330,518 B2 | 2/2008 | Kusunoki |
| 7,346,134 B2 | 3/2008 | Smith |
| 7,489,916 B1 * | 2/2009 | Farias et al. ............ 455/315 |
| 7,876,867 B2 | 1/2011 | Filipovic et al. |
| 2002/0022951 A1 | 2/2002 | Heijningen et al. |
| 2002/0136333 A1 * | 9/2002 | Lee ....................... 375/343 |
| 2002/0187761 A1 | 12/2002 | Im et al. |
| 2002/0187791 A1 | 12/2002 | Ohta et al. |
| 2005/0143044 A1 | 6/2005 | Kim |
| 2006/0040617 A1 * | 2/2006 | Haub et al. ............ 455/67.13 |
| 2006/0116099 A1 * | 6/2006 | Dessert et al. .......... 455/316 |
| 2007/0104298 A1 | 5/2007 | Filipovic et al. |
| 2007/0153878 A1 | 7/2007 | Filipovic |
| 2007/0184782 A1 | 8/2007 | Sahota et al. |
| 2007/0202812 A1 | 8/2007 | Park et al. |
| 2009/0086863 A1 | 4/2009 | Komninakis et al. |
| 2009/0086864 A1 | 4/2009 | Komninakis et al. |

FOREIGN PATENT DOCUMENTS

| | | |
|---|---|---|
| JP | 61177033 A | 8/1986 |
| JP | 10093461 A | 4/1998 |
| JP | 10327091 A | 12/1998 |
| JP | 2000515342 | 11/2000 |
| JP | 2002510892 A | 4/2002 |
| JP | 2006503450 A | 1/2006 |
| JP | 2006148592 A | 6/2006 |
| WO | WO9804050 A1 | 1/1998 |
| WO | WO9950966 A1 | 10/1999 |
| WO | WO02093807 A1 | 11/2002 |
| WO | WO03009557 A1 | 1/2003 |
| WO | WO03065602 | 8/2003 |
| WO | 2004109941 | 12/2004 |
| WO | 2005117417 | 12/2005 |
| WO | WO2008021815 | 2/2008 |

OTHER PUBLICATIONS

International Search Report, PCT/US07/075337—International Search Authority European Patent Office—Dec. 12, 2007.

Written Opinion, PCT/US07/075337—International Search Authority European Patent Office—Dec. 12, 2007.

Faulkner, M., DC Offset and IM2 Removal in Direct Conversion Receivers, IEE Proceedings-Communications, vol. 149, No. 3, Jun. 2002, pp. 179-184.

Taiwan Search Report—TW097151728—TIPO—Feb. 2, 2012.

* cited by examiner

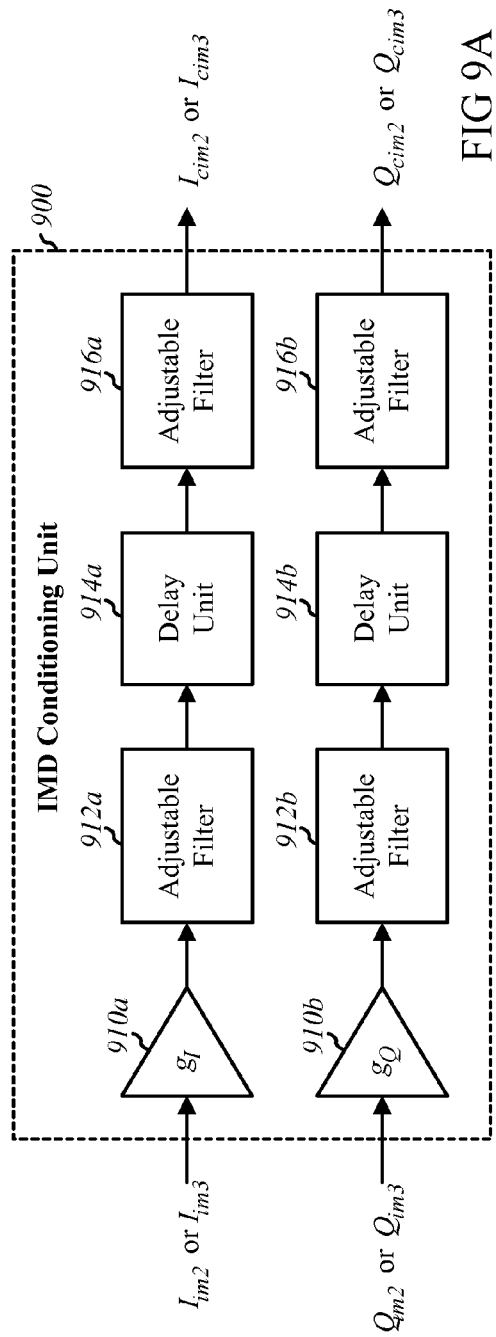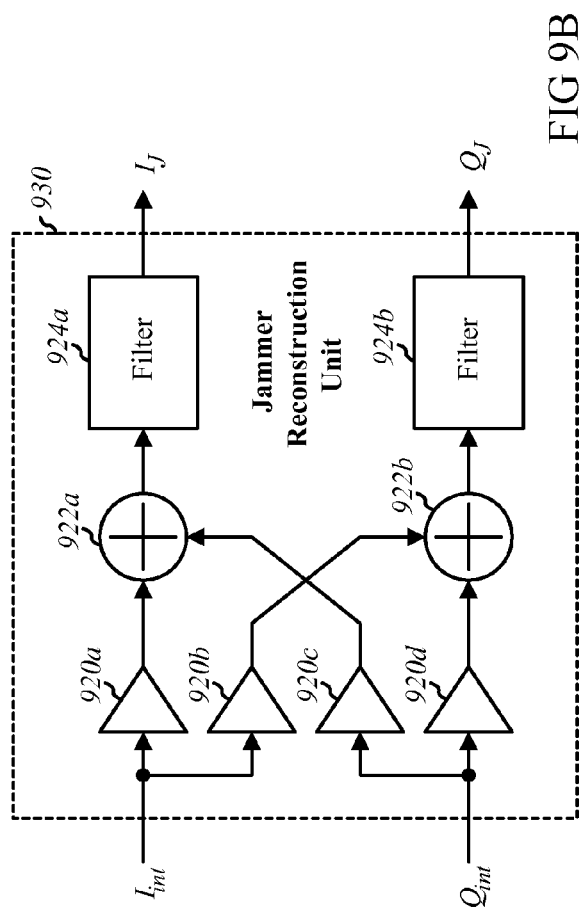

INTERFERENCE DETECTION AND MITIGATION

CLAIM OF PRIORITY

The present Application for Patent claims priority to U.S. Provisional Application Ser. No. 61/018,572, filed Jan. 2, 2008, entitled "Interference Detection and Mitigation," assigned to the assignee hereof, the disclosure of which is hereby expressly incorporated by reference herein. The present Application is also a continuation-in-part of, and claims priority to, U.S. application Ser. No. 11/693,968, filed Mar. 30, 2007, entitled "Intermodulation Distortion Detection and Mitigation," which claims priority to U.S. Provisional Application No. 60/836,608, filed Aug. 8, 2006, entitled "Digital Intermodulation Estimation, Digital Intermodulation Cancellation," all assigned to the assignee hereof, the disclosures of which are hereby expressly incorporated by reference herein.

BACKGROUND

I. Field

The present disclosure relates generally to communications receivers, and more specifically, to techniques for mitigating interference and/or distortion in receivers.

II. Background

In a communications system, a transmitter processes data to generate a modulated signal, and transmits the modulated signal via a communication channel to a receiver. The receiver receives the transmitted signal, and attempts to recover the data sent by the transmitter. The signal may be corrupted by noise, distortion and interference, including, e.g., linear mixing of out-of-band jammers into the desired signal with local oscillator (LO) spurs and other noise sources, as well as inter-modulation products arising from non-linear characteristics of the receiver itself.

It would be desirable to provide processing techniques to combat the effects of such signal corruption.

SUMMARY

An aspect of the present disclosure provides an interference mitigation apparatus, the apparatus configured to process a received signal to recover information, the apparatus comprising: an interference sensor and sampler for sensing and sampling a first interference signal to generate a first sub-signal; a digital rotator for rotating the first sub-signal by a rotation frequency to generate a digital reconstructed interference signal; a correlator for correlating the digital reconstructed interference signal with a digital signal derived from the received signal; and an interference control unit for controlling an adjustment to the processing of the received signal based on the digital reconstructed interference signal to mitigate interference in the received signal.

Another aspect of the present disclosure provides an interference mitigation apparatus, the apparatus configured to process a received signal to recover information, the apparatus comprising: an interference sensor and sampler for sensing and sampling a first interference signal to generate a digital sampled interference signal; an interference reconstruction unit for generating a digital reconstructed interference signal based on the digital sampled interference signal; and a correlator for correlating the digital reconstructed interference signal with a digital signal derived from the received signal; and an interference control unit for controlling an adjustment to a parameter of a radio-frequency (RF) circuit block used to process the received signal based on the output of the correlator.

Yet another aspect of the present disclosure provides an interference mitigation apparatus, the apparatus configured to process a received signal to recover information, the apparatus comprising: a first interference sensor and sampler for sensing and sampling a first interference signal to generate a first sub-signal; an interference reconstruction unit for generating a first digital reconstructed interference signal based on the first sub-signal; and an interference control unit for controlling an adjustment to the processing of the received signal based on the first digital reconstructed interference signal to mitigate interference in the received signal; a second interference sensor and sampler for sensing and sampling a second interference signal to generate a second sub-signal; the interference reconstruction unit further configured to generate a second digital reconstructed interference signal based on the second sub-signal; the interference control unit further configured to, in response to an interference selection control signal, control an adjustment to the processing of the received signal based on the second digital reconstructed interference signal to mitigate interference in the received signal.

BRIEF DESCRIPTION OF THE DRAWINGS

FIG. 9A shows a block diagram of a design of an IMD conditioning unit 900.

FIG. 9B shows a block diagram of a design of a jammer reconstruction unit 930.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

According to the present disclosure, techniques are provided to detect and/or cancel various forms of interference and distortion present in a signal received by a receiver. The techniques described herein may be used for a wireless device, a base station, and other electronics devices. A wireless device may also be referred to as a mobile station, a user equipment, a user terminal, a subscriber unit, etc. A wireless device may be a cellular phone, a personal digital assistant (PDA), a wireless modem, a handheld device, a handset, etc. The techniques may also be used for various communication systems such as Code Division Multiple Access (CDMA) systems, Time Division Multiple Access (TDMA) systems, Frequency Division Multiple Access (FDMA) systems, Orthogonal FDMA (OFDMA) systems, etc. For clarity, the techniques are described below for a wireless device in a CDMA system.

Figure 1:
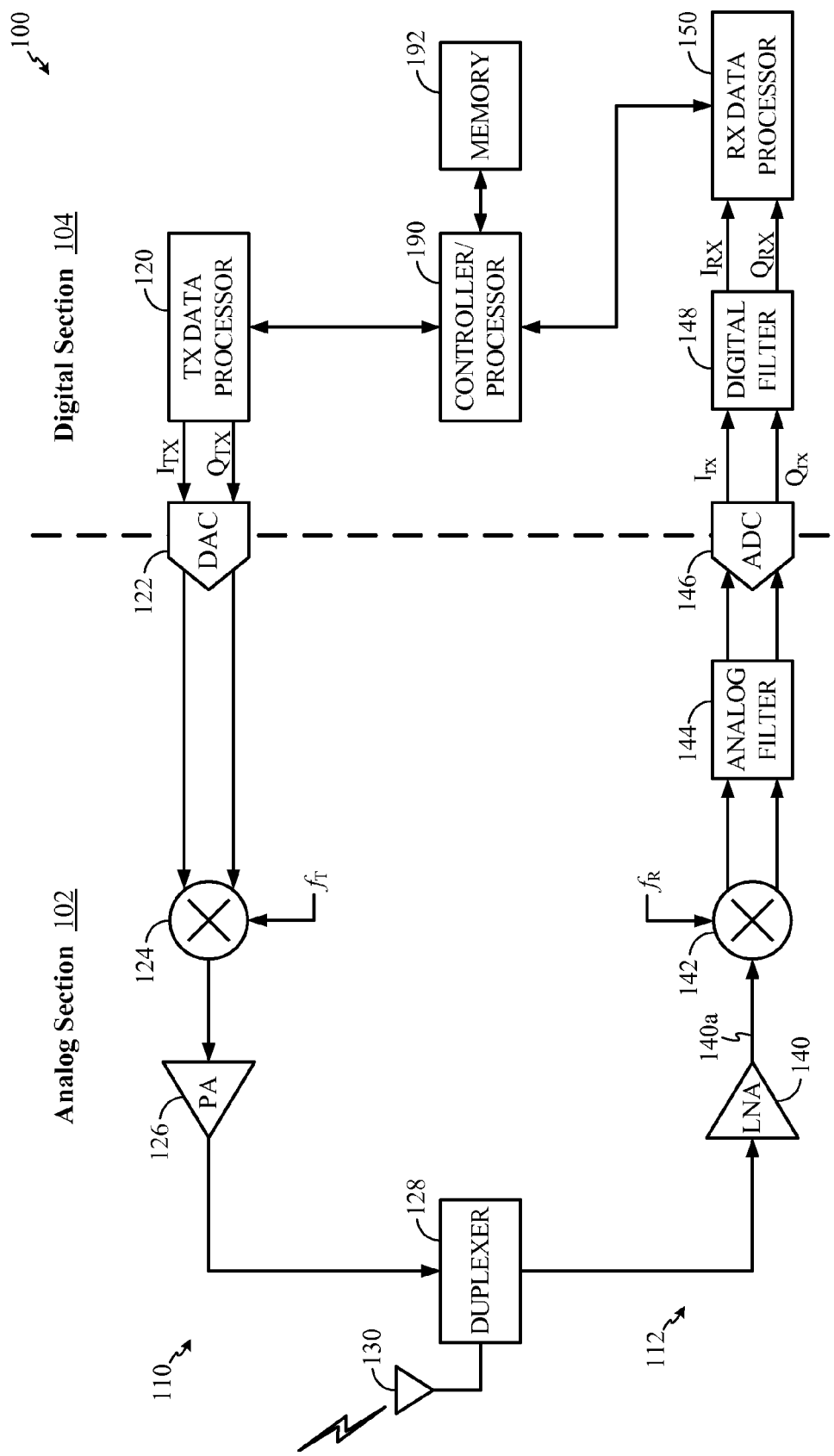
FIG. 1 shows a block diagram of a wireless device 100 that includes an analog section 102 and a digital section 104.

FIG. 1 shows a block diagram of a wireless device 100 that includes an analog section 102 and a digital section 104. Analog section 102 includes (a) a transmitter 110 having a mixer 124 and a power amplifier (PA) 126 and (b) a receiver 112 having a low noise amplifier (LNA) 140, a mixer 142, and an analog filter 144.

On the transmit path, a transmit (TX) data processor 120 processes data to be transmitted and provides a digital in-phase (I) signal, $I_{TX}$, and a digital quadrature (Q) signal, $Q_{TX}$. A digital-to-analog converter (DAC) 122 converts $I_{TX}$ and $Q_{TX}$ into analog I and Q signals. Mixer 124 modulates a transmit local oscillator (LO) signal with the analog I and Q signals and provides a modulated signal. The transmit LO signal is at a frequency of $f_T$, which is determined by a frequency channel used for data transmission by wireless device 100. Power amplifier 126 amplifies the modulated signal and provides a transmit signal, which is routed through a duplexer 128 and transmitted via an antenna 130.

On the receive path, antenna 130 receives signals transmitted by base stations and various interfering sources and provides a received signal. Duplexer 128 routes the received signal from antenna 130 to LNA 140. LNA 140 amplifies its input signal and provides an amplified signal. Mixer 142 demodulates the amplified signal with a receive (RX) LO signal and provides baseband I and Q signals. The RX LO signal is at a frequency of $f_R$, which is determined by a frequency channel being received by wireless device 100. Analog filter 144 filters the baseband I and Q signals to remove noise and other components and provides filtered I and Q signals. Filter 144 may perform anti-alias filtering for the subsequent digitization process. An analog-to-digital converter (ADC) 146 digitizes the filtered I and Q signals and provides digital pre-digital-filtered I and Q signals, $I_{rx}$ and $Q_{rx}$. A digital filter 148 filters the received I and Q signals and provides digital received I and Q signals, $I_{RX}$ and $Q_{RX}$. Filter 148 may attenuate noise and other components generated by the digitization process and may pass a desired signal of interest. A receive (RX) data processor 150 processes the received I and Q signals and provides decoded data.

A controller/processor 190 directs operation of various units within wireless device 100. A memory 192 stores data and program codes for wireless device 100.

In general, a receiver may be implemented with, e.g., a super-heterodyne architecture or a direct-to-baseband architecture. In the super-heterodyne architecture, the received signal is frequency downconverted in multiple stages, e.g., from RF to an intermediate frequency (IF) in one stage, and then from IF to baseband in another stage. In the direct-to-baseband architecture, the received signal is frequency downconverted from RF directly to baseband in one stage, as shown in FIG. 1. The super-heterodyne and direct-to-baseband architectures may use different circuit blocks and/or have different requirements. A transmitter may also be implemented with a super-heterodyne architecture or a direct-from-baseband architecture (as shown in FIG. 1). A transmitter may also be implemented with any other suitable architecture, for example, direct modulation of the baseband phase onto a carrier by a PLL, followed by amplitude modulation of the carrier. For clarity, the following description is for a direct-to-baseband architecture.

Note FIG. 1 shows a simplified transceiver design. In a typical transceiver, the signals in the transmit and receive paths may be conditioned by one or more stages of amplifier, filter, mixer, etc. The circuit blocks may also be arranged differently from the configuration shown in FIG. 1. Furthermore, other circuit blocks not shown in FIG. 1 may also be used to condition the signals in the transmit and receive paths. For example, filters and/or amplifiers may be added before and/or after each mixer. Such alternative exemplary embodiments are contemplated to be within the scope of the present disclosure.

Figure 2:
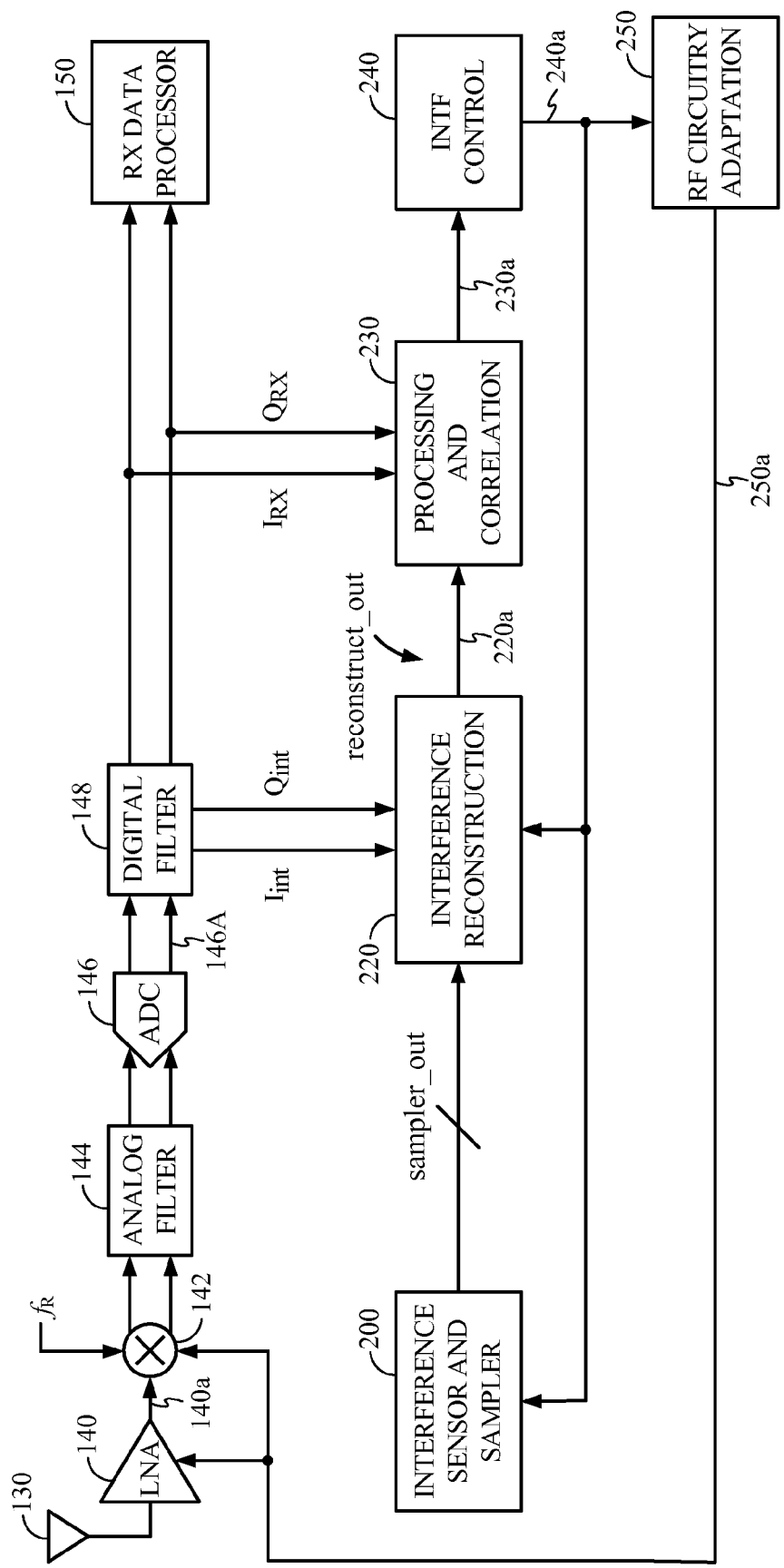
FIG. 2 depicts an exemplary embodiment of a generalized interference sampling and processing scheme according to the present disclosure.

FIG. 2 depicts an exemplary embodiment of a generalized interference sampling and processing scheme according to the present disclosure. In FIG. 2, an interference sensor and sampler 200 senses interference signals that may corrupt the desired RX signal. These may include, for example, out-of-band jammers present at the input or output of the LNA 140, noise on the chip substrate, spurs present in the RX or TX local oscillator (LO) signal, as well as mixed products of such interference signals. Details of the interference sensor and sampler 200 are disclosed further herein with reference to FIGS. 3A-3C.

Interference sensor and sampler 200 provides a digital output sampler_out to interference reconstruction unit 220. Sampler_out may include one or more sub-signals representing the levels of one or more types of interference detected by interference sensor and sampler 200. Note in this specification and in the claims, unless otherwise noted, the term "sense" denotes the act of selecting a signal or part of a signal containing interference for subsequent processing, while the term "sample" denotes the processing applied to a sensed interference signal to make it suitable as an input signal to the interference reconstruction unit 220 later described herein. Since the interference reconstruction unit 220 is conveniently digital (in HW or in SW), a suitable input signal is preferably a signal that is discrete in both time and amplitude. In an exemplary embodiment, if such discretization is not needed (e.g., when the sensed interference signal is already in digital form), then the "sampled" signal may be identical to the "sensed" signal. Such exemplary embodiments are contemplated to be within the scope of the present disclosure.

Based on sampler_out from interference sensor and sampler 200, interference reconstruction unit 220 generates a signal reconstruct_out, or 220a. reconstruct_out is a digital reconstruction of an interference signal expected to be present in the digital RX signals $I_{RX}$ and $Q_{RX}$. In particular, reconstruct_out 220a includes that portion of an interference signal that may occupy the same spectrum as the desired RX signal, and hence cannot be eliminated by filtering alone.

reconstruct_out 220a may be provided to processing and correlation unit 230, which correlates the reconstructed interference 220a with $I_{RX}$ and $Q_{RX}$. The processing and correlation unit 230 determines to what extent the digitally reconstructed interference is actually present in the received RX signal. The output 230a of processing and correlation unit 230 is provided to interference control unit 240, which may generate one or more control signals (not shown) to adjust one or more circuit blocks based on the detected interference levels such that interference in the received I and Q signals is reduced. Examples of such blocks to be controlled include, but are not limited to, the LNA 140, the RX LO generator, and the mixer 142. In an alternative exemplary embodiment, described hereinafter with reference to FIGS. 7 and 8, the digitally reconstructed interference may be conditioned and cancelled from the digital received signal.

In an exemplary embodiment, interference control unit 240 may generate a control signal 240a that is fed back to the interference reconstruction unit 220 to, e.g., control and guide the adjustment of adjustable parameters within the interference reconstruction unit 220, such as filter characteristics etc. Furthermore, signal 240a may be provided to an RF circuitry adaptation unit 250 for adjusting the parameters of RF circuitry in response to the interference detected. In the exemplary embodiment shown, the output signal 250a of RF circuitry adaptation unit 250 may be provided to adjust the parameters of the mixer 142 and the LNA 140. One of ordinary skill in the art may derive exemplary embodiments of RF circuitry adaptation unit 250 to adjust other RF circuitry not shown in FIG. 2, and such exemplary embodiments are contemplated to be within the scope of the present disclosure. One of ordinary skill in the art will also appreciate that the functionality of RF circuitry adaptation unit 250 may be incorporated in the interference control unit 240 in some exemplary embodiments.

Figure 3A:
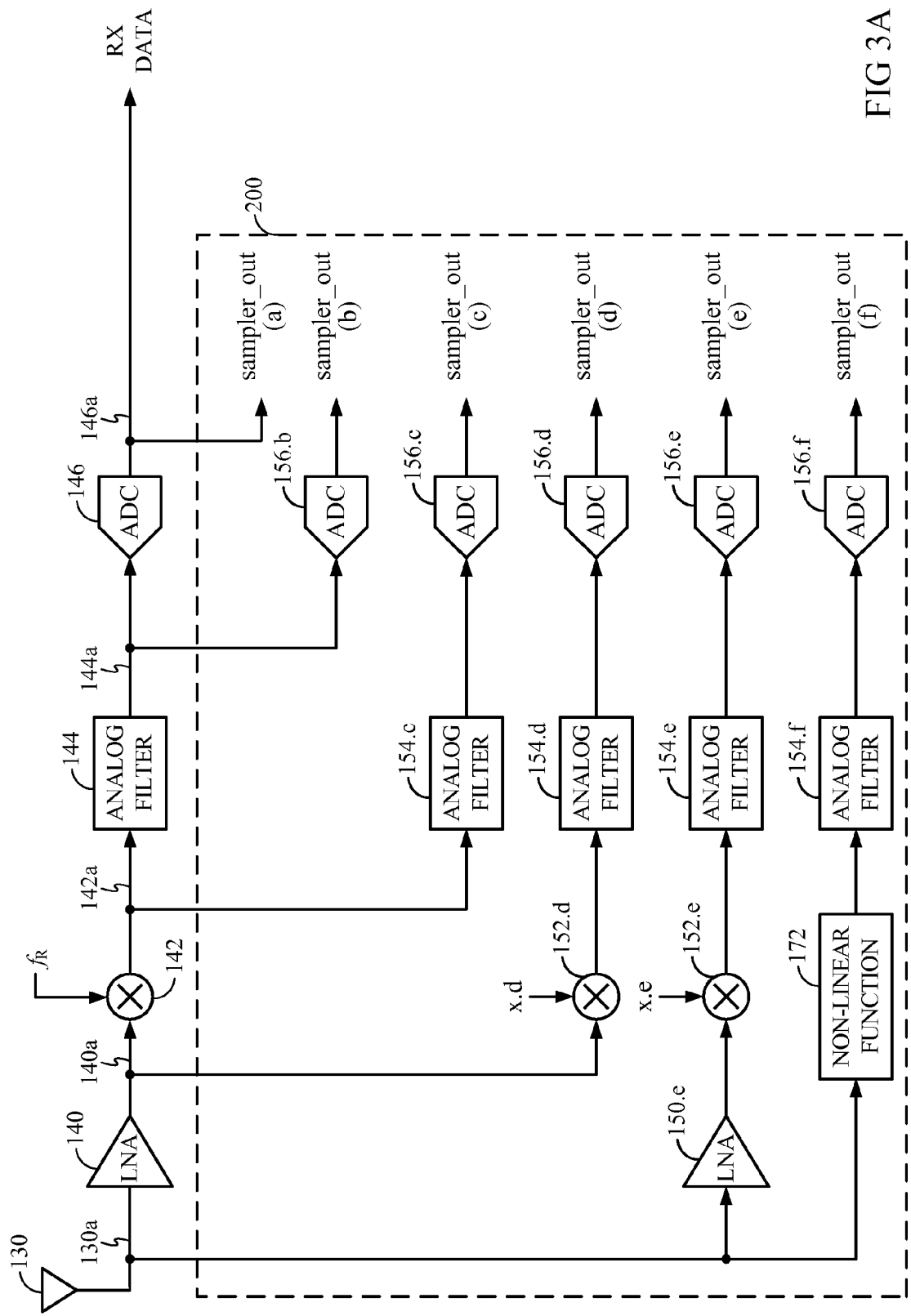
FIG. 3A depicts possible ways for the interference sensor and sampler 200 to generate the signal sampler_out from a receive signal path.

FIG. 3A depicts possible ways for the interference sensor and sampler 200 to generate the signal sampler_out from a signal sensed from the receive signal path. In FIG. 3A, sampler_out is shown as including a plurality of sub-signals (a)-(h). One of ordinary skill in the art will realize that in a particular exemplary embodiment, interference sensor and sampler 200 may generate a sampler_out that includes all or any subset of the sub-signals shown. Such exemplary embodiments are contemplated to be within the scope of the present disclosure. Note in FIG. 3A, signals including both I and Q components may be shown as a single signal for ease of illustration.

In FIG. 3A, sampler_out sub-signals (a) through (f) are sensed from the outputs of successive stages of the receive (RX) signal processing chain. Sub-signal (a) is sensed directly from the output of the ADC 146. Sub-signal (b) is sensed from the input to the ADC 146, and is digitized by a separate ADC 156.b. Sub-signal (c) is sensed from the input to the analog filter 144, and may be filtered by a separate analog filter 154.c and digitized by ADC 156.c. Sub-signal (d) is sensed from the input to mixer 142, and may be downconverted by a separate mixer 152.d. Mixer 152.d may mix the output of the LNA with a signal x.d. In an exemplary embodiment, the signal x.d may be selected according to principles later described herein with reference to FIG. 3D. The output of mixer 152.d is filtered by analog filter 154.d and digitized by ADC 156.d. Sub-signal (e) is sensed from the input to the LNA 140, and may be processed by a separate LNA 150.e, mixer 152.e, analog filter 154.e, and ADC 156.e. The LNA 150.e may amplify the sensed signal, and mix it with a signal x.e using a mixer 152.e. In an exemplary embodiment, the signal x.e may be selected according to principles later described herein with reference to FIG. 3D. The output of the mixer 152.e is filtered by analog filter 154.e and digitized by ADC 156.e. Sub-signal (f) is also sensed from the input to the LNA 140, which is fed to a non-linear device 172. The output of the non-linear device 172 is provided to analog filter 154.f, and digitized by ADC 156.f.

Note in an alternative exemplary embodiment (not shown), a sub-signal (f1) may be sensed from the output of the LNA 140a, and fed to a non-linear device. The output of the non-linear device may be provided to an analog filter, and digitized by an ADC to generate the sub-signal (f1).

One of ordinary skill in the art will realize that alternative receiver exemplary embodiments may employ units not shown in FIG. 3A, such as automatic gain control (AGC), additional filters, etc. The signal sampler_out may include additional sub-signals sensed from the outputs or inputs of such stages not shown, with the appropriate modifications. Such exemplary embodiments are contemplated to be within the scope of the present disclosure.

The signal sampler_out may also include an additional sub-signal (not shown) sensed from an auxiliary antenna separate from the antenna 130 shown in FIG. 2. In an exemplary embodiment, the auxiliary antenna may be located physically closer to a targeted interference source than the antenna 130, or may have frequency transfer characteristics that are better tuned to the interference source.

Figure 3B:
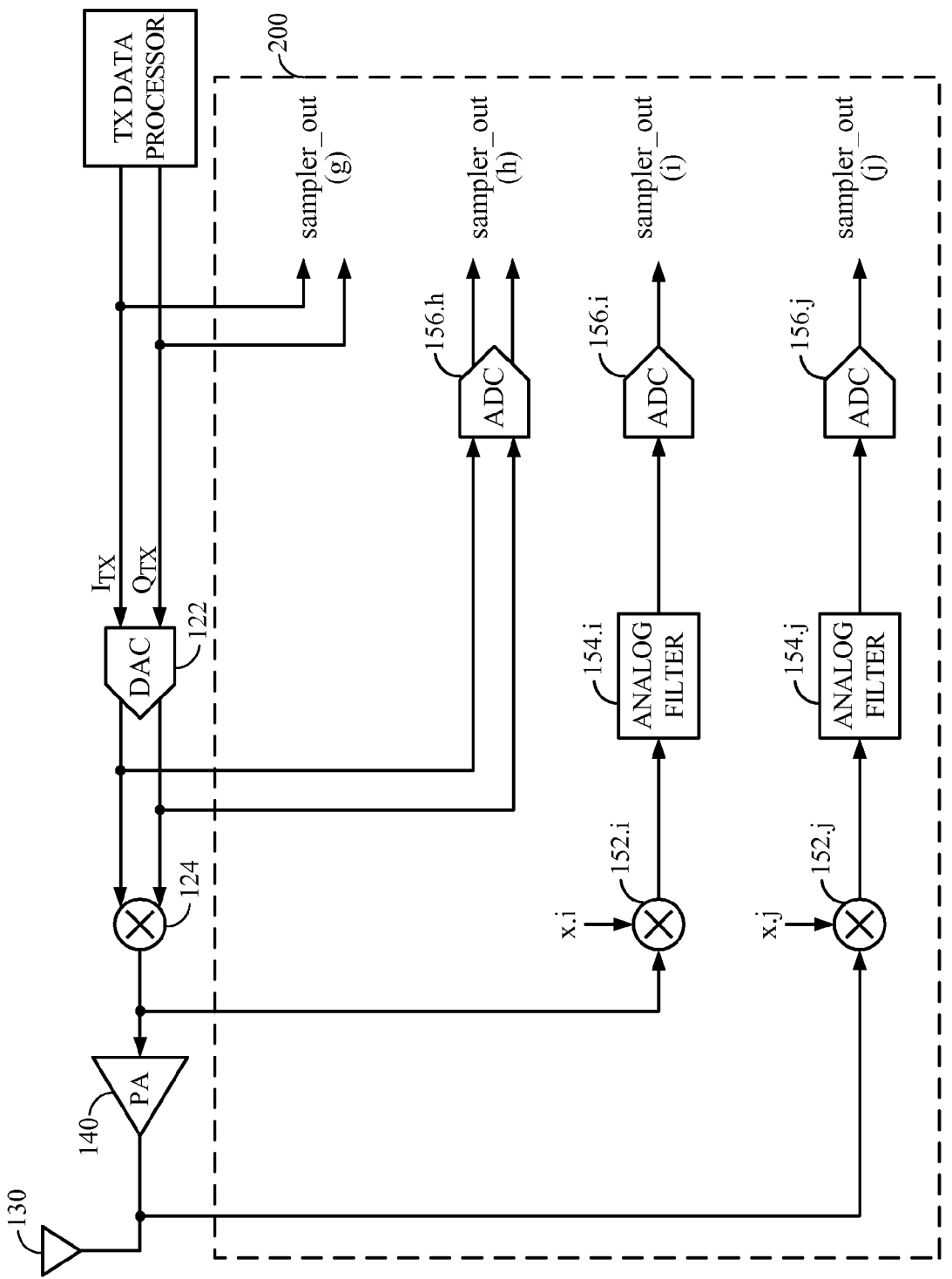
FIG. 3B depicts further ways for interference sensor and sampler 200 to generate the signal sampler_out, based on tapping successive stages of a transmitter chain of the transceiver.

FIG. 3B depicts further ways for interference sensor and sampler 200 to generate the signal sampler_out, based on tapping successive stages of a transmitter (TX) signal processing chain of the transceiver. Sensing an interferer from the transmitter chain as shown in FIG. 3B may be advantageous when the interferer is the transceiver's own TX signal leaking into the RX chain due to, e.g., the imperfect attenuation of the bandpass filters during full-duplex operation. In FIG. 3B, sub-signal (g) is sensed directly from the output of the TX data processor 120. Sub-signal (h) is sensed from the output of the DAC 122, which is re-converted to digital form by ADC 156.*h*. Sub-signal (i) is sensed from the output of the TX mixer 124, which is downconverted by a mixer 152.*g* before being filtered and converted to digital form. Sub-signal (j) is sensed from the output of the power amplifier (PA) 126, which is downconverted by mixer 152.*j* before being filtered and converted to digital form.

One of ordinary skill in the art will realize that alternative transmitter exemplary embodiments may employ units not shown in FIG. 3B, such as pre-amplification stages, additional filters, etc. The signal sampler_out may include additional sub-signals sensed from the outputs or inputs of such stages not shown, with the appropriate modifications. Such exemplary embodiments are contemplated to be within the scope of the present disclosure.

Figure 3C:
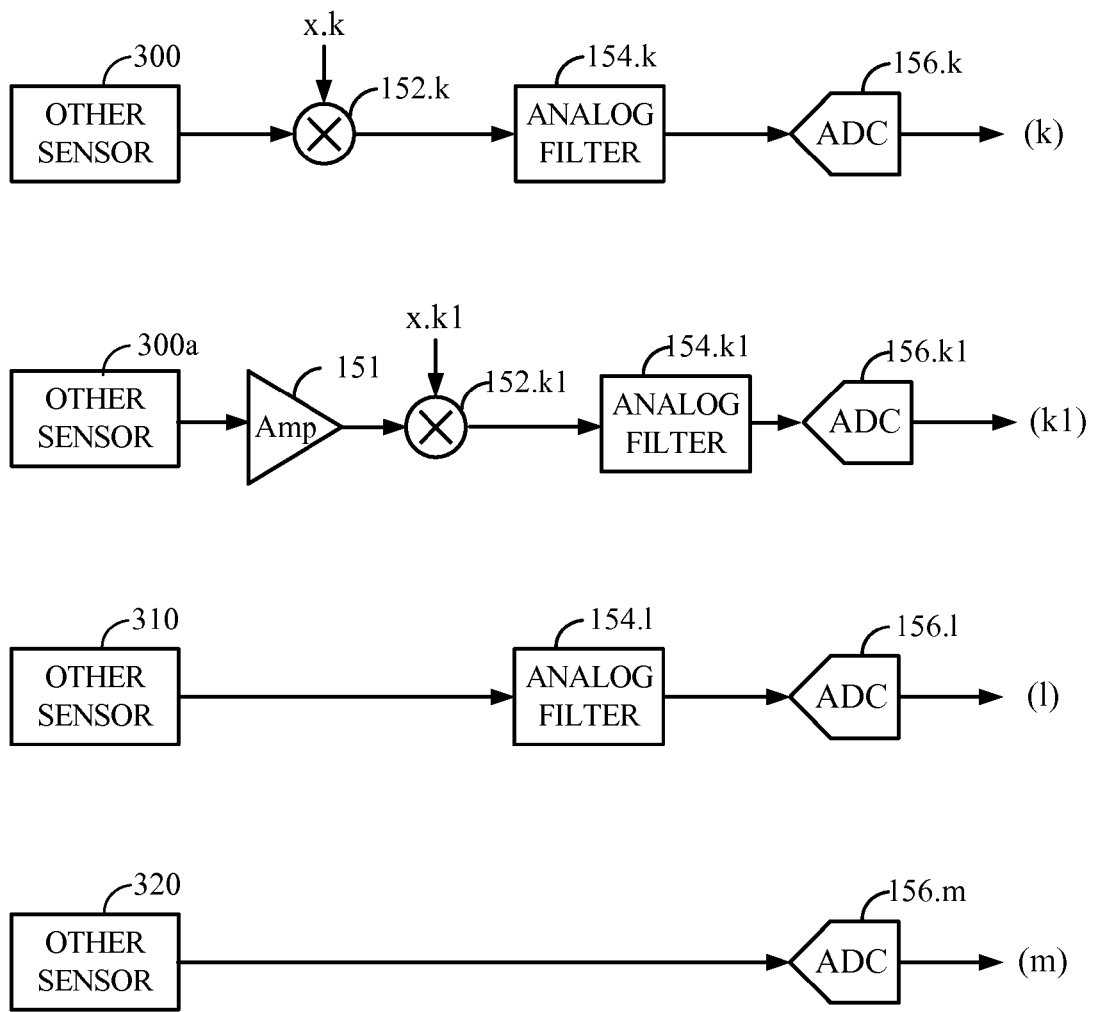
FIG. 3C depicts further ways for interference sensor and sampler 200 to generate the signal sampler_out, based on the outputs of other sensors 300, 300a, 310, 320.

FIG. 3C depicts further ways for interference sensor and sampler 200 to generate the signal sampler_out, based on the outputs of other sensors 300, 300*a*, 310, 320. In an exemplary embodiment, any of other sensors 300, 300*a*, 310, 320 may sense an interference signal other than the signals used to generate sub-signals (a) through (j) depicted in FIGS. 3A and 3B. For example, a sensor may sense substrate noise present in a substrate in which the receiver circuitry resides.

In FIG. 3C, sub-signal (m) is sensed from the output of a sensor 320, which is converted to digital form by ADC 156.*m*. Sub-signal (l) is sensed from the output of sensor 310, which is processed by analog filter 154.1, before being converted to digital form by ADC 156.1. Sub-signal (k) is sensed from the output of sensor 300, which is downconverted by mixer 152.*k*, before being filtered and digitized. Sub-signal (k1) is sensed from the output of sensor 300*a*, amplified by amplifier 151, downconverted by mixer 152.*k*1, and then filtered and digitized. One of ordinary skill in the art will appreciate that various additional units may be added to the exemplary embodiments shown in FIG. 3C, and such modifications are also contemplated to be within the scope of the present disclosure.

In an exemplary embodiment, any of sensors 300-320 may sense levels of noise present on a chip substrate. In alternative exemplary embodiments, any of sensors 300-320 may also sample any other levels of noise present in the circuit.

In an exemplary embodiment, any of the sensors 300-320 may be an antenna located physically closer to a targeted interference source than the antenna 130 as shown in FIG. 1, or otherwise having frequency transfer characteristics that are better tuned to the interference source.

Figure 3D:
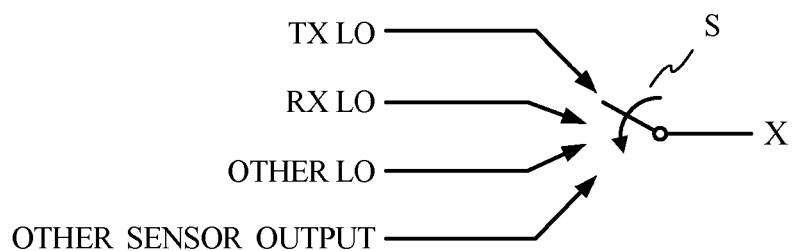
FIG. 3D depicts an exemplary embodiment of possible choices for the signals x.d, x.e, x.i, x.j, x.k provided to the mixers 152.d, 152.e, 152.i, 152.j, 152.k in FIGS. 3A-3C.

FIG. 3D depicts an exemplary embodiment of possible choices for the signal x.d, x.e, x.i, x.j, x.k provided to the mixers 152.*d*, 152.*e*, 152.*i*, 152.*j*, 152.*k*, respectively, in FIGS. 3A-3C. In FIG. 3D, x may represent any one of the signals x.d, x.e, x.i, x.j, x.k. In an exemplary embodiment, x may be selected during normal operation from any of the choices depicted using, e.g., a switch S. In an alternative exemplary embodiment, x may be fixed as any one of the choices depicted.

A first choice for the signal x is the transmit local oscillator (TX LO) signal in FIG. 1. This choice may be advantageous when the interference desired to be reconstructed arises from the transmit signal generated by the transceiver itself, as is described later herein with respect to FIGS. 4B-4C.

A second choice for the signal x is the receive local oscillator (RX LO) signal in FIG. 1.

A third choice for the signal x is any other LO having a selected frequency. For example, in an exemplary embodiment, such other LO may be selected as having a frequency of a spur of the RX or TX LO, as is described later herein with respect to FIG. 11A.

A fourth choice for the signal x is an analog output of any interference signal sensor. For example, in an exemplary embodiment, a sensor may be a substrate noise sensor for detecting noise present on the chip substrate. Further details of this exemplary embodiment are described herein with respect to FIGS. 12A-12B.

According to the present disclosure, the signal sampler_out, including sampler_out sub-signals, may be provided to an interference reconstruction unit 220 to digitally reconstruct intermodulation products, or other interference terms expected to be present in the received signal. Such products and interference terms may include, but are not limited to, first-order linear products (e.g., direct frequency translation of jammers), second-order intermodulation products (IM2), third-order intermodulation products (IM3), and/or higher-order products.

Note in some exemplary embodiments, the signal sampler_out may be passed directly to the processing and correlation module 230 of FIG. 2, i.e., the interference reconstruction unit 220 may be a simple pass-through unit. Such exemplary embodiments are contemplated to be within the scope of the present disclosure.

Note while FIGS. 3A-3C show a single instance of each type of sampler_out sub-signal, one of ordinary skill in the art will realize that the signal sampler_out may generally comprise multiple instances of any sub-signal, and/or arbitrary combinations of any sub-signal with any other sub-signal. For example, sampler_out may be a composite signal comprising a first sub-signal (d) wherein x.d has a frequency f1, a second sub-signal (d) wherein x.d has a frequency f2, etc. Such exemplary embodiments are contemplated to be within the scope of the present disclosure.

One of ordinary skill in the art will appreciate that due to its flexibility, the exemplary embodiment of the interference sensor and sampler 200 shown in FIGS. 3A-3C may be dynamically configured to address different types of interference in the received signal depending on the conditions of signal reception. For example, the interference sensor and sampler 200 may be alternately configured to generate a first sampler_out sub-signal for processing when a first type of interference is detected, and to generate a second sampler_out sub-signal for processing when a second type of interference is detected. In an exemplary embodiment, the control signal 240*a* provided by interference control unit 240 may further include an interference selection control signal specifying which sub-signal is to be generated by the interference sensor and sampler 200. In an exemplary embodiment, the interference selection control signal may be configured based on a type of interference detected to be present in the received signal.

FIGS. 4A-4E show specific applications of the general architecture of FIG. 2 to exemplary embodiments for mitigating the effects of particular types of interference in a received signal. Note the exemplary embodiments depicted in FIGS. 4A-4E are intended to serve as illustrations only, and are not meant to limit the scope of the general architecture of FIG. 2 to any particular exemplary embodiment depicted.

Figure 4A:
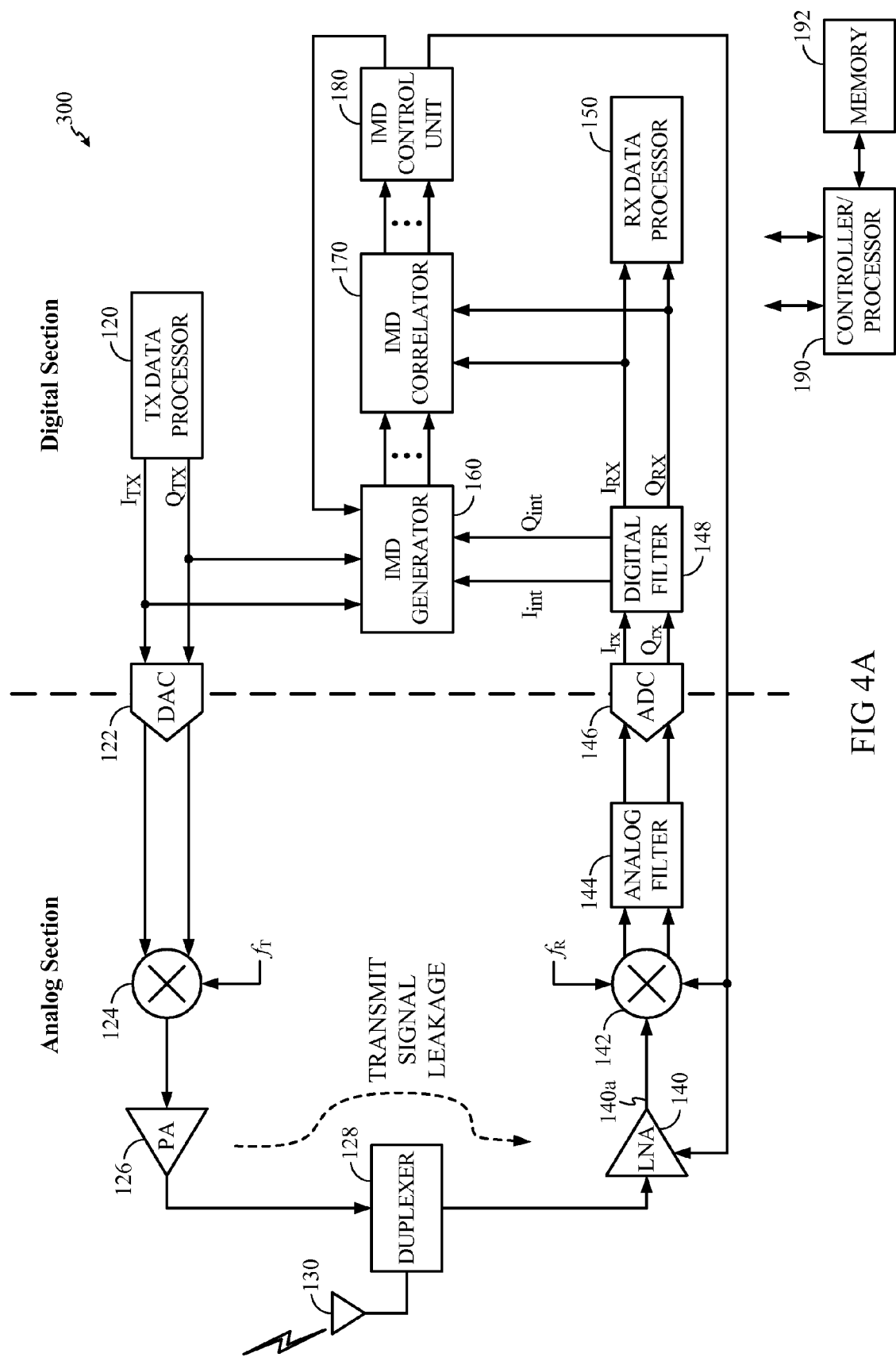
FIG. 4A shows a block diagram of a design of a wireless device 300 that digitally reconstructs inter-modulation distortion (IMD) in the receive signal generated by the transmit chain of the same transceiver.

FIG. 4A shows a block diagram of a design of a wireless device 300 that digitally reconstructs inter-modulation distortion (IMD) in the receive signal attributable to a signal leaked from the transmit chain of the same transceiver. In FIG. 4A, a portion of the transmit signal is shown leaked via duplexer 128 to the LNA 140. The signal at the input of LNA 140 thus includes the received signal from antenna 130, as well as transmit signal leakage from power amplifier 126. To address this specific interference source, the receiver may digitally reconstruct the portion of the transmit signal leaked to the receiver chain based on sampler_out sub-signal (g), as described further hereinbelow.

In FIG. 4A, the IMD reconstruction and detection is based on the sampler_out sub-signal (g) shown in FIG. 3B. The components of sub-signal (g) are referred to as $I_{TX}$ and $Q_{TX}$. Wireless device 300 includes units 120 through 150, 190 and 192 within wireless device 100 in FIG. 1. Wireless device 300 further includes an IMD generator 160, an IMD correlator 170, and an IMD control unit 180, which are specific exemplary embodiments of interference reconstruction unit 220, interference processing/correlation unit 230, and interference control unit 240, respectively, in FIG. 2. Note in the exemplary embodiment of FIG. 4A, the interference sensor and sampler 200 may be a simple connection between the signals $I_{TX}$ and $Q_{TX}$ of the TX Data Processor 120 and the interference reconstruction unit 220. Alternatively, the interference sensor and sampler 200 may be implemented as shown in FIGS. 3A-3C, with the sampler_out sub-signal (g) selectively enabled from among a plurality of sub-signals.

In FIG. 4A, IMD generator 160 receives the digital I and Q signals, $I_{TX}$ and $Q_{TX}$, from TX data processor 120. IMD generator 160 may digitally reconstruct the IMD due to the transmit signal. IMD correlator 170 receives the reconstructed IMD and the received I and Q signals, $I_{RX}$ and $Q_{RX}$, from digital filter 148, and correlates $I_{RX}$ and $Q_{RX}$ with the digitally reconstructed IMD. IMD control unit 180 determines the levels of IMD in the received I and Q signals based on the correlation results. IMD control unit 180 generates one or more controls to adjust one or more circuit blocks based on the detected IMD levels such that IMD in the received I and Q signals is reduced. In FIG. 4A, the characteristics of the LNA 140 and mixer 142 are shown being adjusted by the IMD control unit, although the present disclosure is not limited to adjustment of only the LNA and mixer blocks.

Note in an alternative exemplary embodiment (not depicted in FIG. 4A), IMD generator 160 may also receive intermediate I and Q signals, $I_{int}$ and $Q_{int}$, from digital filter 148, as described later herein with reference to FIG. 8.

In the exemplary embodiment of FIG. 4A, wireless device 300 reconstructs IMD based on a digital version of the transmit signal. This may simplify the design of wireless device 300 and reduce cost since the processing to reconstruct IMD may be performed digitally without using extra analog circuitry.

Figure 4B:
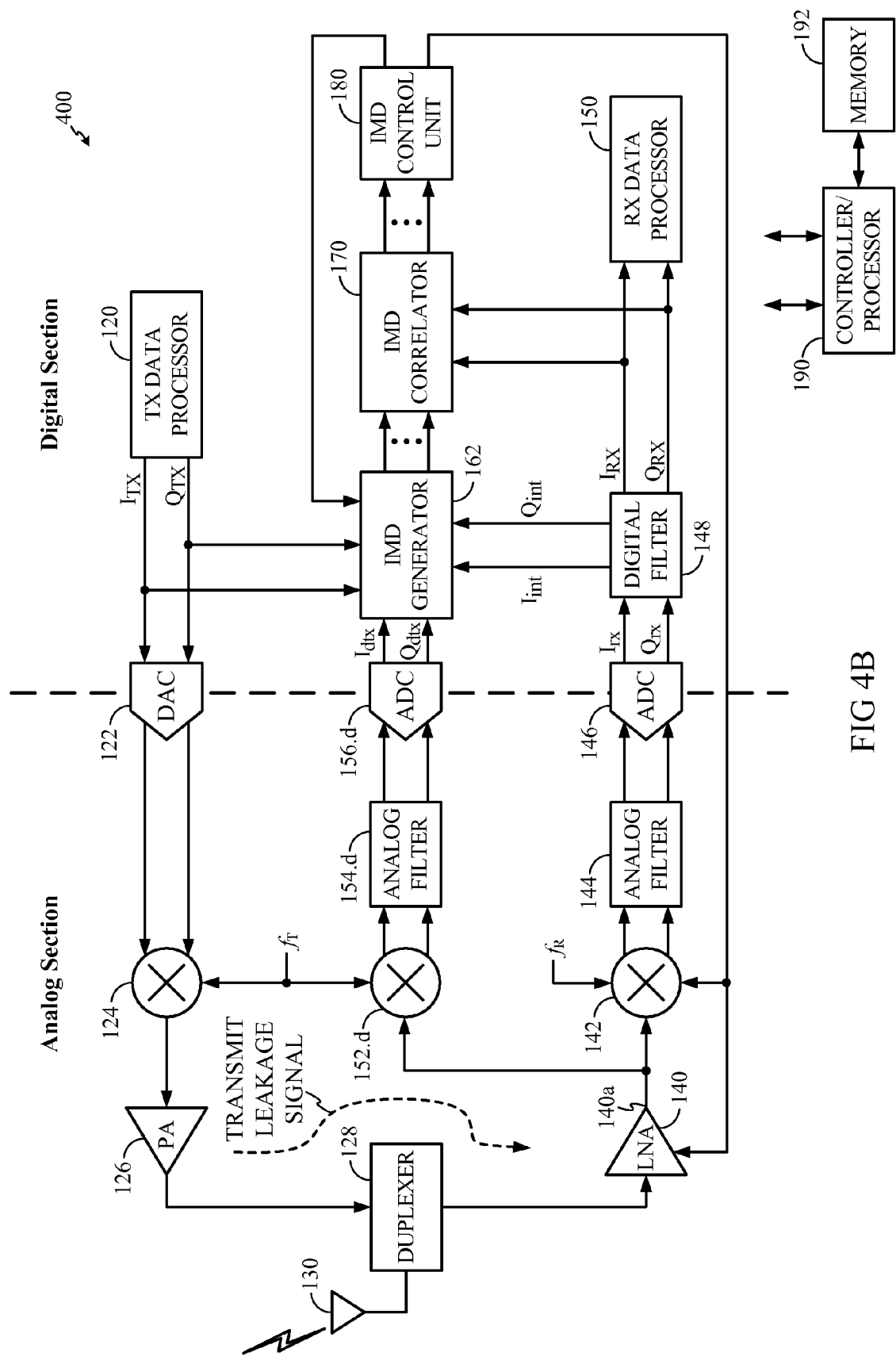
FIG. 4B shows a block diagram of a design of a wireless device 400 with digital IMD reconstruction and detection based on a downconverted version of the transmit signal.

FIG. 4B shows a block diagram of a design of a wireless device 400 with digital IMD reconstruction and detection based on a downconverted version of the transmit signal. In this exemplary embodiment, the sampler_out sub-signal (d) in FIG. 3A is effectively selected for further processing. The TX LO, or a signal having the same frequency as the TX LO, may be used as the signal x.d applied to the mixer 152.*d* to generate sub-signal (d).

In FIG. 4B, wireless device 400 includes units 120 through 150, 190 and 192 within wireless device 100 in FIG. 1. Wireless device 400 further includes an IMD generator 162, IMD correlator 170, and IMD control unit 180. The IMD generator 162, IMD correlator 170, and IMD control unit 180 are specific exemplary embodiments of the interference reconstruction unit 220, interference processing/correlation unit 230, and interference control unit 240, respectively.

In FIG. 4B, as in FIG. 4A, a portion of the transmit signal is shown leaked via duplexer 128 to the LNA 140. The signal at the input of LNA 140 thus includes the received signal from antenna 130 as well as a transmit leakage signal from power amplifier 126. To target this specific interference source, the oscillator signal x.d corresponding to sub-signal (d) may be set to the TX LO signal, as earlier described with reference to FIG. 3D.

Mixer 152.*d* demodulates the amplified signal from LNA 140 using x.d. In the exemplary embodiment shown, the same transmit LO signal is provided to both mixer 124 in the transmit path and mixer 152.*d* in the interference sampling path. An analog filter 154.*d* filters the baseband I and Q signals to remove noise and other components, and provides filtered I and Q signals. An ADC 156.*d* digitizes the filtered I and Q signals and provides sampler_out sub-signal (d), referred to as $I_{dtx}$ and $Q_{dtx}$ in FIG. 4B, to IMD generator 162. The units 152.*d*, 154.*d*, 156.*d* correspond to the units for generating sampler_output sub-signal (d) in the exemplary embodiment of interference sensor and sampler 200 shown in FIG. 3A.

In FIG. 4B, IMD generator 162 receives $I_{dtx}$ and $Q_{dtx}$ from ADC 156.*d* and may also receive the intermediate I and Q signals, $I_{int}$ and $Q_{int}$, from digital filter 148, as later described with reference to FIG. 8. IMD generator 162 digitally reconstructs the IMD due to the transmit leakage signal. IMD correlator 170 receives the digital IMD and the received I and Q signals, $I_{RX}$ and $Q_{RX}$, from digital filter 148, correlates the received I and Q signals with the digitally reconstructed IMD, and provides correlation results. IMD control unit 180 determines the levels of IMD in the received I and Q signals based on the correlation results and generates one or more controls for one or more circuit blocks to reduce the detected IMD levels. Note, as previously mentioned, while sampler_out sub-signal (d) includes the effects of transmit signal leakage, it also includes the desired RX signal in the received signal from antenna 130. Consequently, any IMD reconstruction based on sub-signal (d) may also include the desired RX signal. In an exemplary embodiment, however, the magnitude of the desired RX signal is typically much smaller than the magnitude of the interference signal. For example, the interference signal may have a power level that is 50-80 dB higher than the desired signal. In such cases, the effects of the desired signal on interference reconstruction/cancellation may be deemed negligible.

While the exemplary embodiment of FIG. 4B is shown with the signal x.d having the same frequency as the TX LO, one of ordinary skill in the art will realize that the signal x.d need not have the same frequency associated with the TX LO of the same transceiver. In general, the frequency of x.d may be tuned to any jammer that is expected to cause interference to the desired signal, as further described herein with reference to FIG. 4D. Such jammers may include, but are not limited to, interference from nearby (e.g., integrated on the same board or die, or other independent devices in the physical proximity) transmitters operating according to the IEEE 802.11 standard, other cellular radio standards, the Bluetooth protocol, and/or FM radio transmitters. Such exemplary embodiments are contemplated to be within the scope of the present disclosure.

Figure 4C:
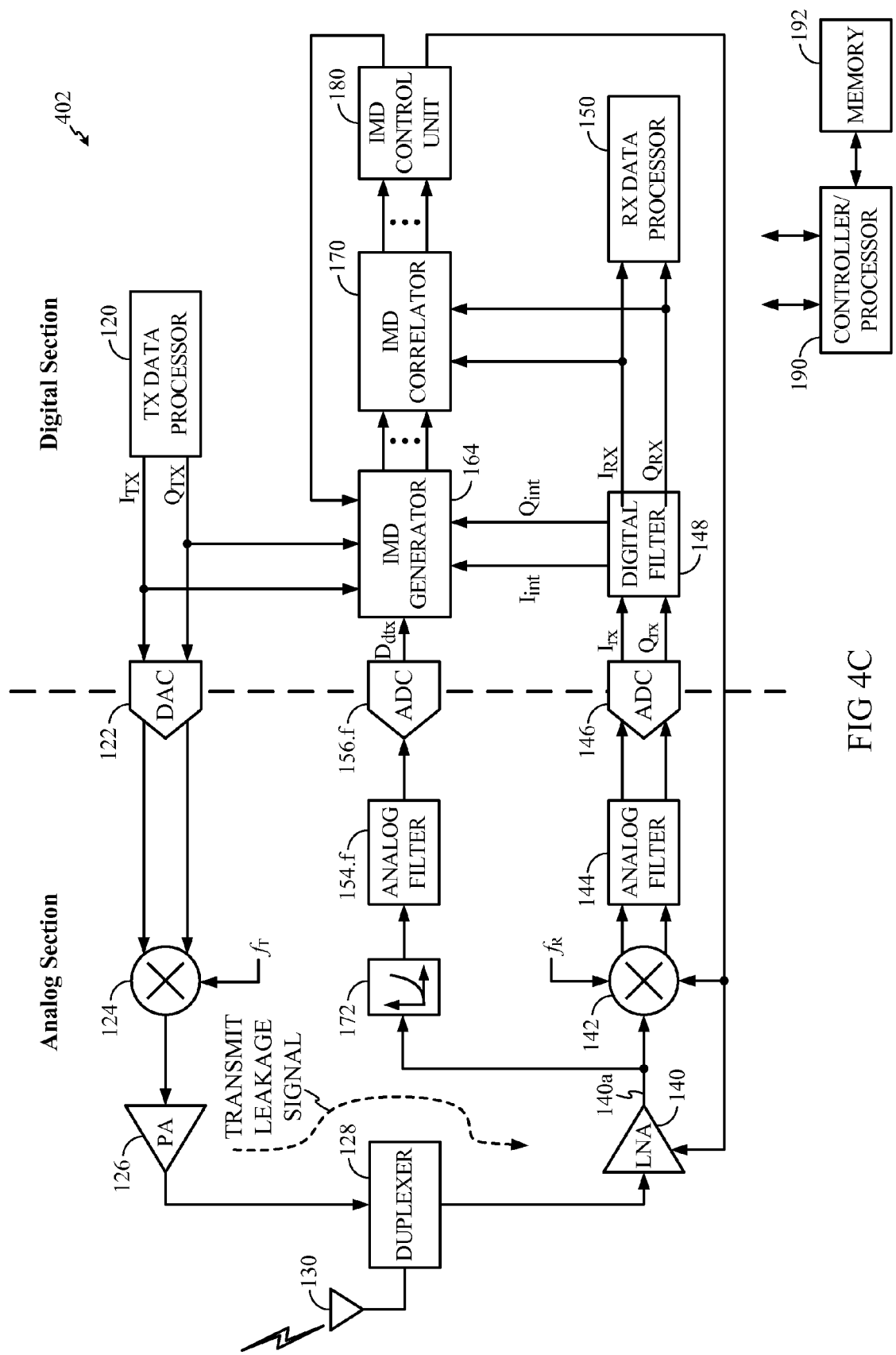
FIG. 4C shows a block diagram of a design of a wireless device 402 performing digital IMD reconstruction and detection based on sampler_out sub-signal (f) of FIG. 3A.

FIG. 4C shows a block diagram of a design of a wireless device 402 performing digital IMD reconstruction and detection based on sampler_out sub-signal (f) of FIG. 3A. Wireless device 402 includes units 120 through 150, 190 and 192 within wireless device 100 in FIG. 1. Wireless device 402 further includes an IMD generator 164, IMD correlator 170, and IMD control unit 180. The IMD generator 164, IMD correlator 170, and IMD control unit 180 are specific exemplary embodiments of the interference reconstruction unit 220, interference processing/correlation unit 230, and interference control unit 240, respectively. Note the interference sensor and sampler 200 may be implemented as shown in FIG. 4C, or as shown in FIGS. 3A-3C, i.e., with the sampler_out sub-signal (f) selected from among a plurality of sampler_out sub-signals.

In FIG. 4C, a non-linear device 172 receives the amplified signal from LNA 140, and applies a non-linear transfer function to the amplified signal. The non-linear transfer function may be a square function, an exponential function, etc., and effectively downconverts the transmit signal component from RF frequencies to baseband. An analog filter 154.f filters the output signal from device 172 to remove noise and other components and provides a filtered signal. An ADC 156.f digitizes the filtered signal and provides sampler_out sub-signal (f), also referred to as $D_{dtx}$ in FIG. 4C, to IMD generator 164. The units 172, 154.f, 156.f correspond to the units for generating sampler_output sub-signal (f) in the exemplary embodiment of interference sensor and sampler 200 shown in FIG. 3A.

Figure 4D:
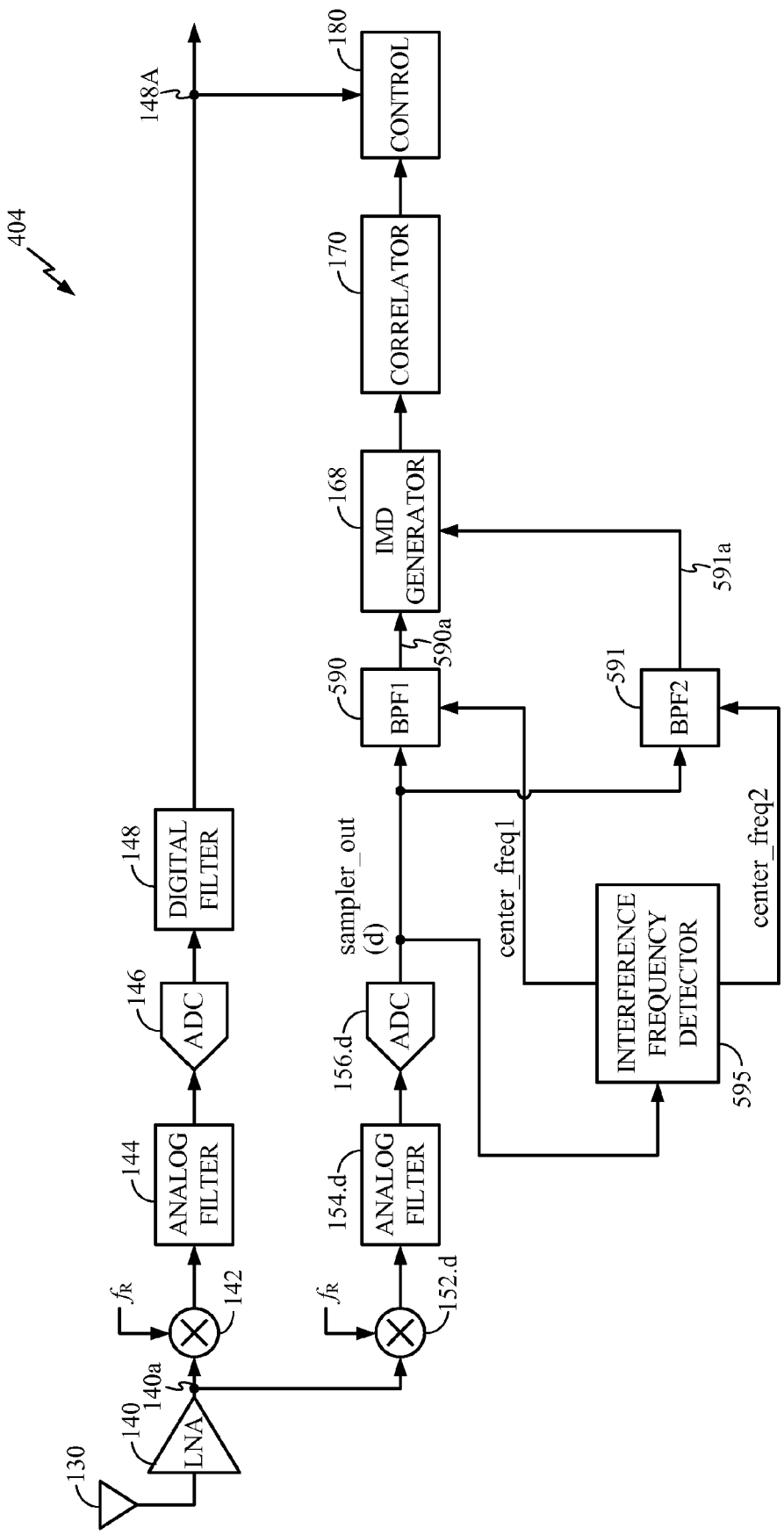
FIG. 4D shows a block diagram of a design of a wireless device 404 with digital IMD reconstruction and detection based on a downconverted version of interference signals that do not necessarily coincide with the transmitted signal.

FIG. 4D shows a block diagram of a design of a wireless device 404 with digital IMD reconstruction and detection based on a downconverted version of an interference signal that does not necessarily coincide with a leaked version of the transmitted signal. In FIG. 4D, the IMD generator 168, correlation unit 170, and control unit 180 are specific exemplary embodiments of the interference reconstruction unit 220, interference processing/correlation unit 230, and interference control unit 240, respectively.

In FIG. 4D, sampler_out sub-signal (d) may be generated as disclosed with reference to FIG. 3A, with signal x.d having the same frequency as the RX LO. Sub-signal (d) is provided to an interference frequency detector 595, which may determine the frequencies associated with one or more jammers in the sub-signal (d). In an exemplary embodiment (not shown), interference frequency detector 595 may be optional, e.g., when the interference frequency is known a priori. An example of this is when the interference is due to a known harmonic of a known reference frequency such as a 19.2 MHz crystal oscillator.

In an exemplary embodiment, interference frequency detector 595 may be implemented using a fast-Fourier transform (FFT) module that computes the power in sub-signal (d) at discrete frequencies to evaluate the likelihood of jammers being present at those frequencies. The interference frequency detector 595 may output two frequencies center_freq1 and center_freq2 to band-pass filters BPF1 590 and BPF2 591, respectively. BPF1 590 and BPF2 591 each filter sub-signal (d) to obtain 590a and 591a, which correspond to the jammers present in sub-signal (d) at frequencies center_freq1 and center_freq2. Signals 590a and 591a may then be provided to IMD generator 168, which may compute intermodulation products of the two jammers. In an exemplary embodiment, IMD generator 168 may be implemented as the IMD generator 166 later described with reference to FIG. 5E herein. Alternatively, IMD generator 168 may be implemented using any techniques for generating IMD known to one of ordinary skill in the art, in light of the present disclosure.

Figure 4E:
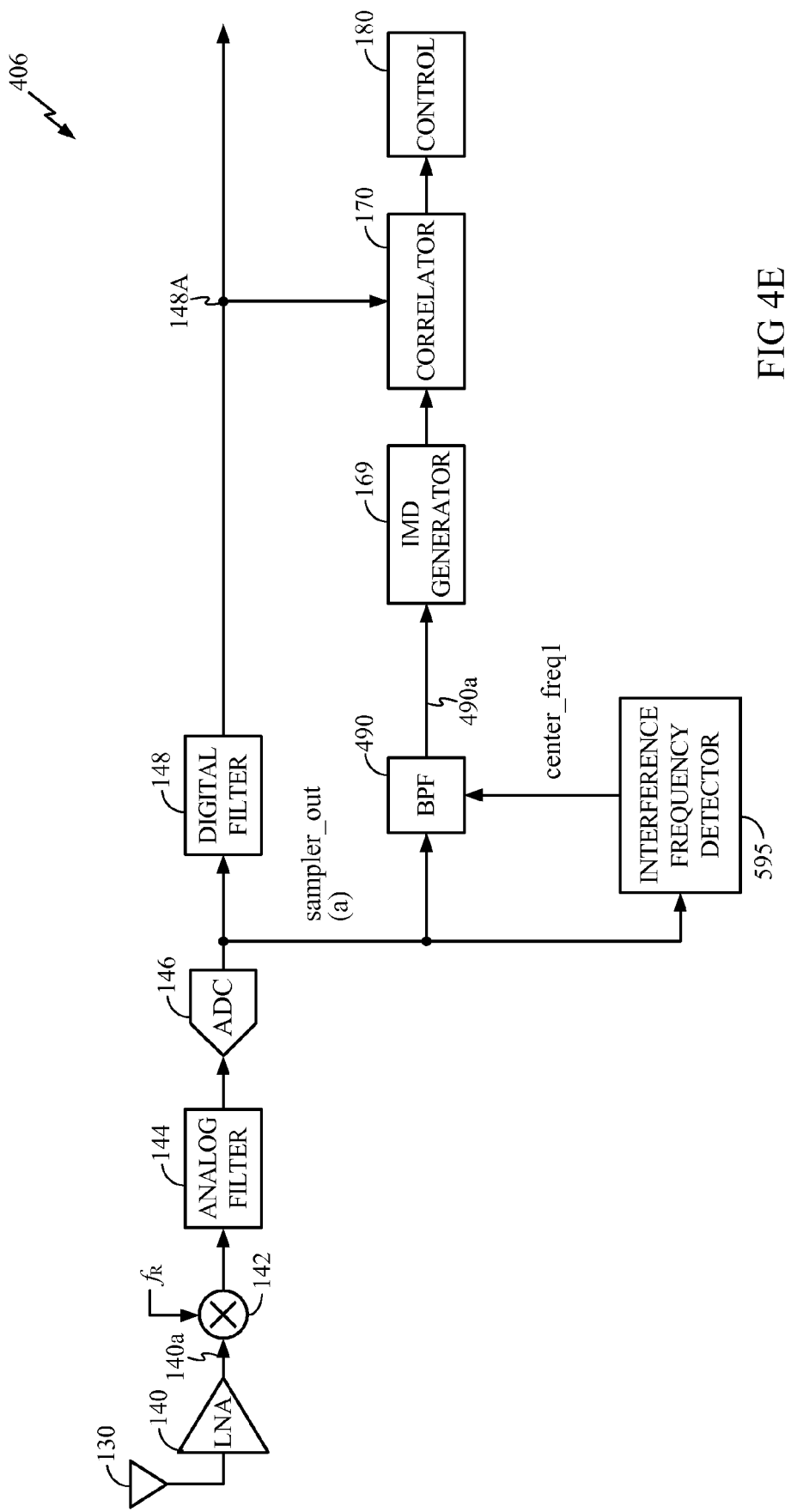
FIG. 4E shows a block diagram of a design of a wireless device 406 with digital IMD reconstruction and detection based on the digital output of ADC 146.

FIG. 4E shows a block diagram of a design of a wireless device 406 with digital IMD reconstruction and detection based on the digital output of ADC 146. The IMD generator 169, correlation unit 170, and control unit 180 are specific exemplary embodiments of the interference reconstruction unit 220, interference processing/correlation unit 230, and interference control unit 240, respectively.

In FIG. 4E, sampler_out sub-signal (a) is sensed from the output of ADC 146 as disclosed with reference to FIG. 3A. Sub-signal (a) is provided to an interference frequency detector 595. The interference frequency detector 595 may output a frequency center_freq1 to band-pass filter BPF 490. In the exemplary embodiment shown, BPF 490 has a center frequency adjustable based on the frequency center_freq1. In an exemplary embodiment, frequency center_freq1 may be a zero frequency, in which case BPF 490 is effectively a low-pass filter.

BPF 490 filters sub-signal (a) to obtain 490a, which may correspond to an estimate of the jammer present in sub-signal (a) at frequency center_freq1. Signal 490a is then provided to IMD generator 169, which may compute the intermodulation product of the jammer with another interference source (not shown). In an exemplary embodiment, the other interference source may be a separately detected and digitized jammer (not shown), or it may correspond to sub-signals (g) or (d) generated from the TX signal transmitted by the transceiver itself. Note in general, the interference frequency detector 595 may be designed to detect the presence of any number of potential jammers, and corresponding BPF units (not shown) provided to isolate such jammers. Such jammers may then be used to digitally reconstruct $3^{rd}$ order or higher order IMD according to the techniques of the present disclosure. Such exemplary embodiments are contemplated to be within the scope of the present disclosure.

In an exemplary embodiment, IMD generator 169 may be implemented as the IMD generator 166 described with reference to FIG. 5E herein, with appropriate modifications made to the inputs supplied to IMD generator 166. Alternatively, IMD generator 169 may be implemented using any techniques for generating IMD known to one of ordinary skill in the art, in light of the present disclosure.

In an exemplary embodiment, digital filter 148 in FIGS. 4A-4E may include multiple filter stages. A first filter stage may have a relatively wide bandwidth and may attenuate images and quantization noise from the digitization by ADC 146. For example, if ADC 146 is a sigma-delta ADC with noise shaping, then the first filter stage may attenuate high frequency quantization noise from the ADC. A second filter stage may have a narrow bandwidth that passes the desired signal and attenuates jammers. The second filter stage may perform channel selection, jammer rejection, noise filtering, down sensing, etc.

Note one of ordinary skill in the art will realize that additional processing units may be added to any of the exemplary embodiments depicted in FIGS. 4A-4E, and the units shown in the figures may have functionality beyond that explicitly described. For example, additional filters may be placed in the signal path. Other variations of the exemplary embodiments will be clear to one of ordinary skill in the art in light of the present disclosure, and are contemplated to be within the scope of the present disclosure.

FIGS. 5A-5E depict specific exemplary embodiments of interference reconstruction unit 220 in FIG. 2. Note the exemplary embodiments are shown for illustration only, and are not meant to limit the scope of the present disclosure to the exemplary embodiments shown.

Figure 5A:
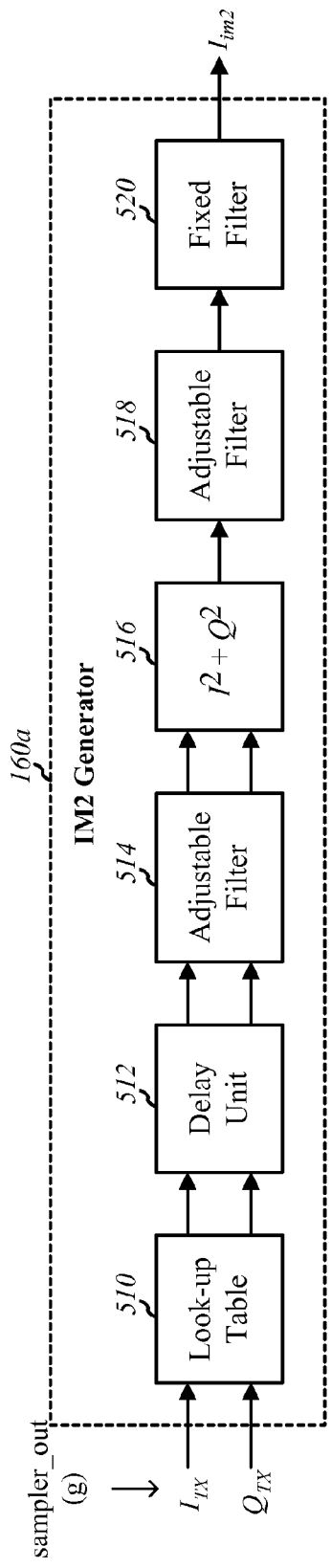
FIG. 5A depicts an exemplary embodiment of an interference reconstruction unit for generating a second-order inter-modulation product (IM2).

FIG. 5A depicts an exemplary embodiment of an interference reconstruction unit for generating a second-order intermodulation product (IM2). For illustration purposes, the IM2 generator 160a in FIG. 5A is shown digitally reconstructing IM2 based on the sampler_out sub-signal (g) depicted in FIG. 3B. One of ordinary skill in the art will realize nevertheless that the principles disclosed with reference to IM2 generator 160a may be modified to reconstruct IM2 based on any suitable sampler_out sub-signal described with reference to FIGS. 3A-3C.

Note IM2 generator 160a may provide at least part of the functionality of the interference reconstruction unit 220 in FIG. 2. Within IM2 generator 160a, a look-up table (LUT) 510 receives the output I and Q signals and provides compensated I and Q signals. Look-up table 510 may account for characteristics of various circuit blocks in the transmit path, e.g., power amplifier 126, mixer 124, etc. A delay unit 512 delays the I and Q outputs of look-up table 510 by a variable amount of delay. An adjustable filter 514 filters the I and Q outputs of delay unit 512 with a first filter response. In an exemplary embodiment, when the input to 160a in FIG. 5A is sampler_out sub-signal (i) or (j) from FIG. 3B, the adjustable filter 514 may be configured to equalize the characteristics of components used for sampler_out sub-signal generation, e.g., the analog filter 154.$i$ or 154.$j$, and/or filter out quantization noise from the ADC 156.$i$ or 156.$j$. In an exemplary embodiment wherein the input to 160a is sampler_out sub-signal (g) from FIG. 3B, the adjustable filter 514 may be configured to provide no filtering at all.

A unit 516 computes the sum of the square magnitudes of the I and Q outputs from filter 514. An adjustable filter 518 filters the output of unit 516 with a second filter response.

In an exemplary embodiment, IM2 generator 160a digitally reconstructs the IM2 due to the transmit signal leaking through duplexer 128 into the receive path. The reconstructed IM2 may be designed to match the received IM2, i.e., the IM2 present in the received I and Q signals as sensed at the output of digital filter 148. IM2 generator 160a includes various units that may be adjusted to match the reconstructed IM2 to the received IM2. For example, delay unit 512 may be used to time align the reconstructed IM2 with the received IM2. Filters 514 and 518 may be used to match the frequency response of the reconstructed IM2 with the frequency response of the received IM2.

In an exemplary embodiment, filter 514 may be designed to account for the frequency responses of the various circuit blocks applied to the transmit leakage signal from DAC 122 to mixer 142. Filter 518 may account for the frequency responses of circuit blocks observed by the transmit leakage signal after mixer 142. A fixed filter 520 filters the output of filter 518 to remove noise and out-of-band components and provides digital IM2, $I_{im2}$.

Note in alternative exemplary embodiments, filters 514, 518, 520 may be designed to replicate any desired frequency response.

In an exemplary embodiment, filters 514 and 518 may each be implemented as a 2-tap finite impulse response (FIR) filter having the following filter response (Eq 1):

$$z(n)=(c) \cdot x(n)+(1-c) \cdot x(n-1),$$

where
x(n) is an input signal into the filter for sense period n,
z(n) is an output signal from the filter for sense period n, and
c is a filter coefficient less than 1.

In an exemplary embodiment, a coefficient $c_1$ may be used as c for filter 514, and a coefficient $c_2$ may be used as c for filter 518. Coefficients $c_1$ and $c_2$ may be selected such that the reconstructed IM2 has a frequency response (e.g., a roll-off or droop) that matches the frequency response of the received IM2. Filters 514 and 518 may also be implemented as higher order FIR filters, infinite impulse response (IIR) filters, or filters of other types. In an exemplary embodiment, each coefficient $c_1$ and $c_2$ may be chosen adaptively to maximize the correlation between the reconstructed interference and the received signal.

Figure 5B:
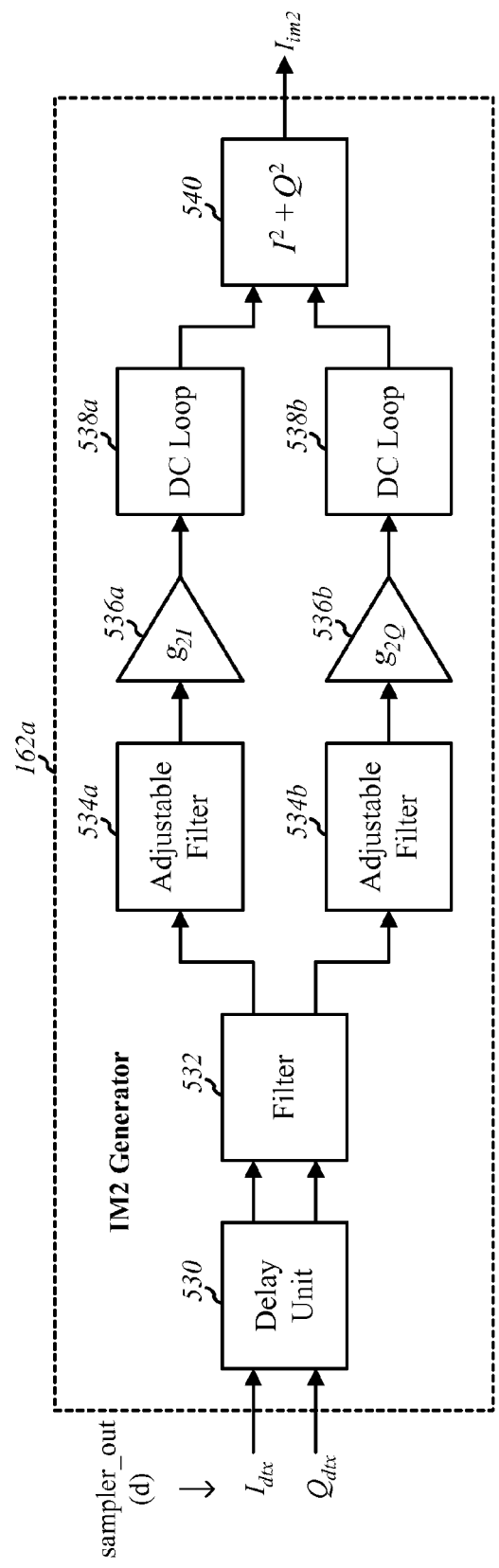
FIG. 5B shows a block diagram of a design of an IM2 generator 162a that digitally reconstructs IM2 based on sampler_out sub-signal (d) from ADC 156.d in FIG. 3A.

FIG. 5B shows a block diagram of a design of an IM2 generator 162a that digitally reconstructs IM2 based on sampler_out sub-signal (d) from ADC 156.$d$ in FIG. 3A. In FIG. 5B, sub-signal (d) is shown as including two signals $I_{dtx}$ and $Q_{dtx}$. IM2 generator 162a may provide at least part of the functionality of the interference reconstruction unit 220 in FIG. 2. Within IM2 generator 162a, a delay unit 530 delays the downconverted I and Q signals by a variable amount of delay. A filter 532 filters the I and Q outputs of delay unit 530 to remove noise and other components generated by digitization. Adjustable filters 534a and 534b filter the I and Q outputs of filter 532 with filter responses that may be adjusted separately for I and Q. Gain units 536a and 536b scale the outputs of filters 534a and 534b, respectively, with gains $g_{2I}$ and $g_{2Q}$ that may be selected separately for I and Q. In an exemplary embodiment, filters 534a and 534b and gain units 536a and 536b may be used to offset amplitude imbalance in the I and Q paths to compute the sum $I^2+Q^2$. The downconverted I and Q signals, $I_{dtx}$ and $Q_{dtx}$, may have DC offset due to circuit blocks such as ADC 156.$d$, etc. DC loops 538a and 538b attempt to remove the DC offset in the outputs of gain units 536a and 536b, respectively. DC loops 538a and 538b may also be placed at other locations, e.g., after filter 532, or after filters 534a and 534b, etc. A unit 540 computes the sum of the square magnitudes of the I and Q outputs of DC loops 538a and 538b and provides digital IM2, $I_{im2}$. Although not shown in FIG. 5B, a DC loop may be added after unit 540 and used to remove DC component from the digital IM2.

In an exemplary embodiment, the signal x.d provided to the mixer 152.$d$ to generate sampler_out sub-signal (d) may correspond to the TX LO. In alternative exemplary embodiments, the signal x.d may have a frequency corresponding to the center frequency of any jammer.

Figure 5C:
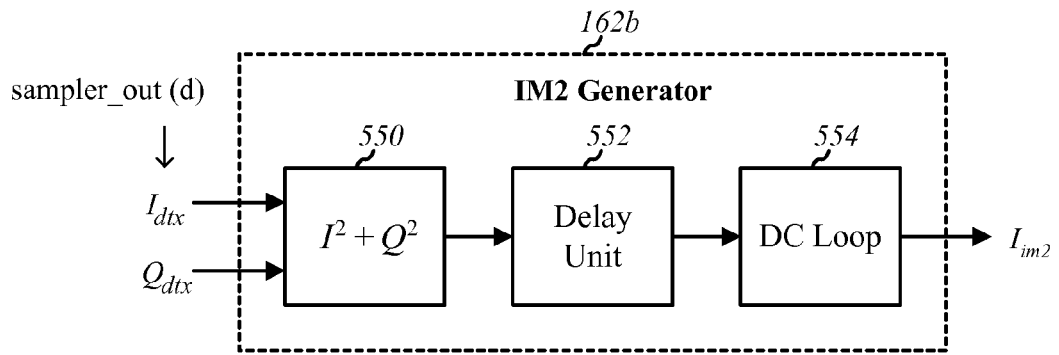
FIG. 5C shows a block diagram of a design of an IM2 generator 162b that digitally reconstructs IM2 based on the downconverted I and Q signals, $I_{dtx}$ and $Q_{dtx}$, derived from sampler_out sub-signal (d) in FIG. 3A.

FIG. 5C shows a block diagram of a design of an IM2 generator 162b that digitally reconstructs IM2 based on the downconverted I and Q signals, $I_{dtx}$ and $Q_{dtx}$, from sampler_out sub-signal (d) in FIG. 3A. IM2 generator 162b may provide at least part of the functionality of interference reconstruction unit 220 in FIG. 2. Within IM2 generator 162b, a unit 550 computes the square magnitude of the downconverted I and Q signals. A delay unit 552 delays the output of unit 550 by a variable amount of delay. A DC loop 554 removes DC offset in the output of delay unit 552 and provides digital IM2, $I_{im2}$. Since the reconstructed $I_{im2}$ signal is intended to mimic the IMD in the received I and Q signals, and since the received I and Q signals (and the IMD contained in them) observe a distortionless combined frequency response starting from analog filter 144 and ending after digital filter 148, the generated IM2 may closely match the frequency response of the received IM2. Filtering may thus be omitted in IM2 generator 162b.

Figure 5D:
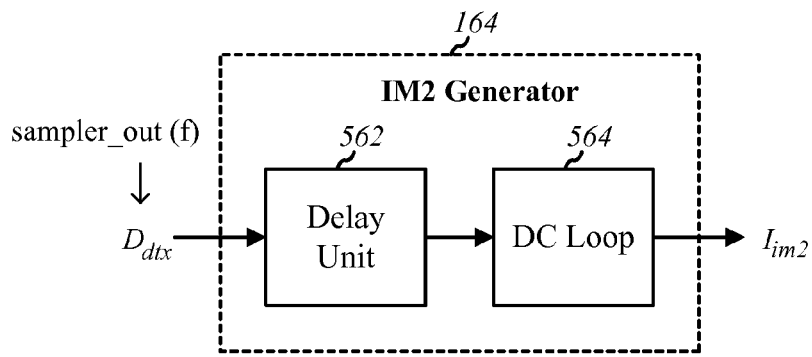
FIG. 5D shows a block diagram of a design of IM2 generator 164.

FIG. 5D shows a block diagram of a design of IM2 generator 164. IM2 generator 164 receives the sampler_out subsignal (f), also denoted as digital downconverted signal, $D_{dtx}$, and provides digital IM2, $I_{im2}$. Note for sampler_out subsignal (f), the actual generation of IM2 may be performed by non-linear device 172. Within IM2 generator 164, a delay unit 562 delays the digital downconverted signal, $D_{dtx}$, from ADC 156.f by a variable amount of delay. A DC loop 564 removes DC offset in the output of delay unit 562 and provides the digital IM2, $I_{im2}$.

Note FIGS. 5A through 5D show four specific IM2 generator designs. IM2 may also be reconstructed in other manners, e.g., with other configurations and/or other units. For example, in FIG. 5A, filters 514 and 518 may be combined into one filter, delay unit 512 may be moved after unit 516, etc. As another example, in FIG. 5C, a filter may be provided, e.g., before or after delay unit 552. In general, IM2 may be reconstructed with variable gain, variable delay, adjustable frequency response, DC offset removal, etc., or any combination thereof.

Figure 5E:
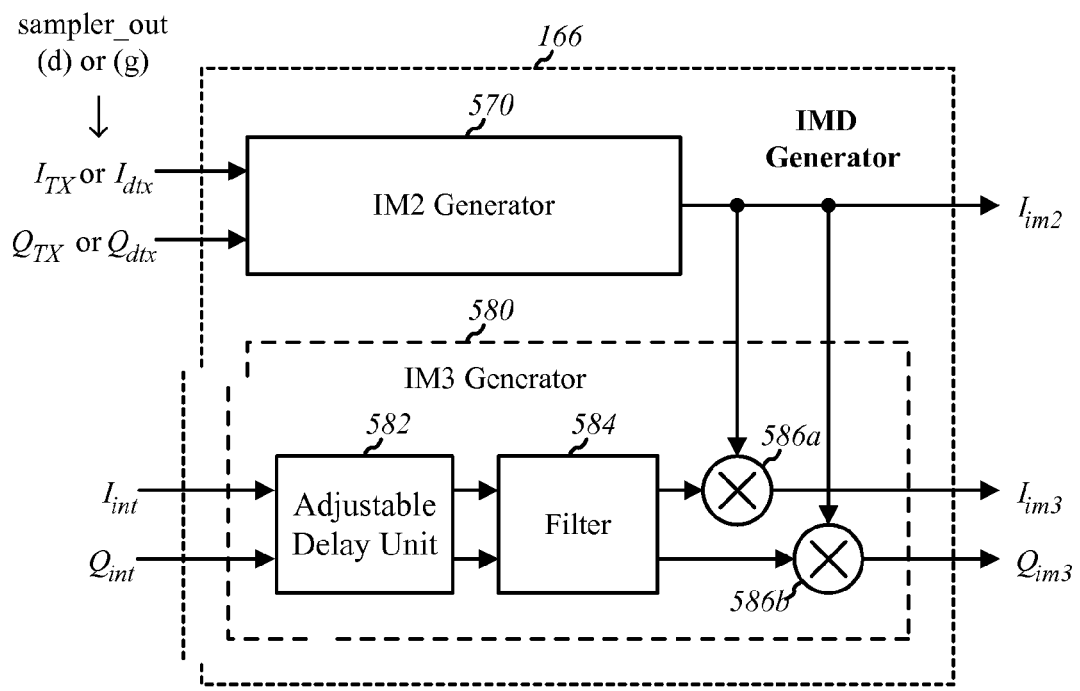
FIG. 5E shows a block diagram of a design of an IMD generator 166 that digitally reconstructs IM2 and IM3.

FIG. 5E shows a block diagram of a design of an IMD generator 166 that digitally reconstructs IM2 and IM3. IMD generator 166 may provide at least part of the functionality of interference reconstruction unit 220 in FIG. 2.

IMD generator 166 includes an IM2 generator 570 and an IM3 generator 580. IM2 generator 570 may receive, e.g., sampler_out sub-signal (g), i.e., $I_{TX}$ and $Q_{TX}$, from TX data processor 120 in FIG. 3B, or sampler_out sub-signal (d), i.e., $I_{dtx}$ and $Q_{dtx}$, from ADC 156.d in FIG. 3A, or sampler-out sub-signal (f), i.e., the downconverted signal, $D_{dtx}$, from ADC 156.f in FIG. 3A. IM2 generator 570 digitally reconstructs IM2 based on the inputs and provides digitally reconstructed IM2, $I_{im2}$. IM2 generator 570 may be implemented using IM2 generator 160a in FIG. 5A, IM2 generator 162 in FIG. 5B, IM2 generator 162b in FIG. 5C, IM2 generator 164 in FIG. 5D, or some other design not shown. IM3 generator 580 receives the intermediate I and Q signals, $I_{int}$ and $Q_{int}$, from a first filter stage (later described herein with reference to FIG. 8), with jammers unattenuated or weakly attenuated. The IM3 generator 580 further receives the reconstructed IM2 from IM2 generator 570, and digitally reconstructs IM3. Within IM3 generator 580, an adjustable delay unit 582 delays the intermediate I and Q signals such that the jammers in these signals are time aligned with the reconstructed IM2 from IM2 generator 570. In an exemplary embodiment, the delay of the adjustable delay unit 582 is dynamically configured to maximize the correlation between the reconstructed IM3 and the received signal. In an exemplary embodiment, part of the delay of the adjustable delay unit 582 may be pre-calculated by taking into account the digital delay associated with the IM2 generator 570 minus the delay of the first stage of the digital filter 148.

A filter (e.g., an equalizer) 584 may follow (or precede) adjustable delay unit 582 and may restore the jammer signal included in the intermediate I and Q signals. Multipliers 586a and 586b multiply the reconstructed IM2 with the delayed and filtered (e.g., equalized) I and Q signals, respectively, which contain the jammer, to provide digital IM3, $I_{im3}$ and $Q_{im3}$.

FIG. 5E shows a specific IM3 generator design. One of ordinary skill in the art will appreciate that IM3 may also be reconstructed in other manners, e.g., with other configurations and/or other units. For example, delay unit 582 may delay the reconstructed IM2 instead of the intermediate I and Q signals. As another example, a filter may be added before or after delay unit 582, after multipliers 584a and 584b, etc. In general, IM3 may be reconstructed with variable gain, variable delay, adjustable frequency response, or any combination thereof.

The IMD generator 166 shown in FIG. 5E may also be provided with alternative I and Q input signals to those depicted. For example, the signal 590a (which may comprise an I and a Q signal) from the output of BPF 590 in FIG. 4D may be provided as I and Q inputs to the IM2 generator 570, while the signal 591a (which may also comprise an I and a Q signal) from the output of BPF 591 in FIG. 4D may be provided as I and Q inputs to the IM3 generator 580. Other exemplary embodiments providing alternative signals not explicitly enumerated herein to the IMD generator 166 are contemplated to be within the scope of the present disclosure.

One of ordinary skill in the art will also realize that higher-order IMD products than IM3 may be digitally reconstructed using the techniques described with reference to FIG. 3. Such exemplary embodiments are also contemplated to be within the scope of the present disclosure.

Figure 6:
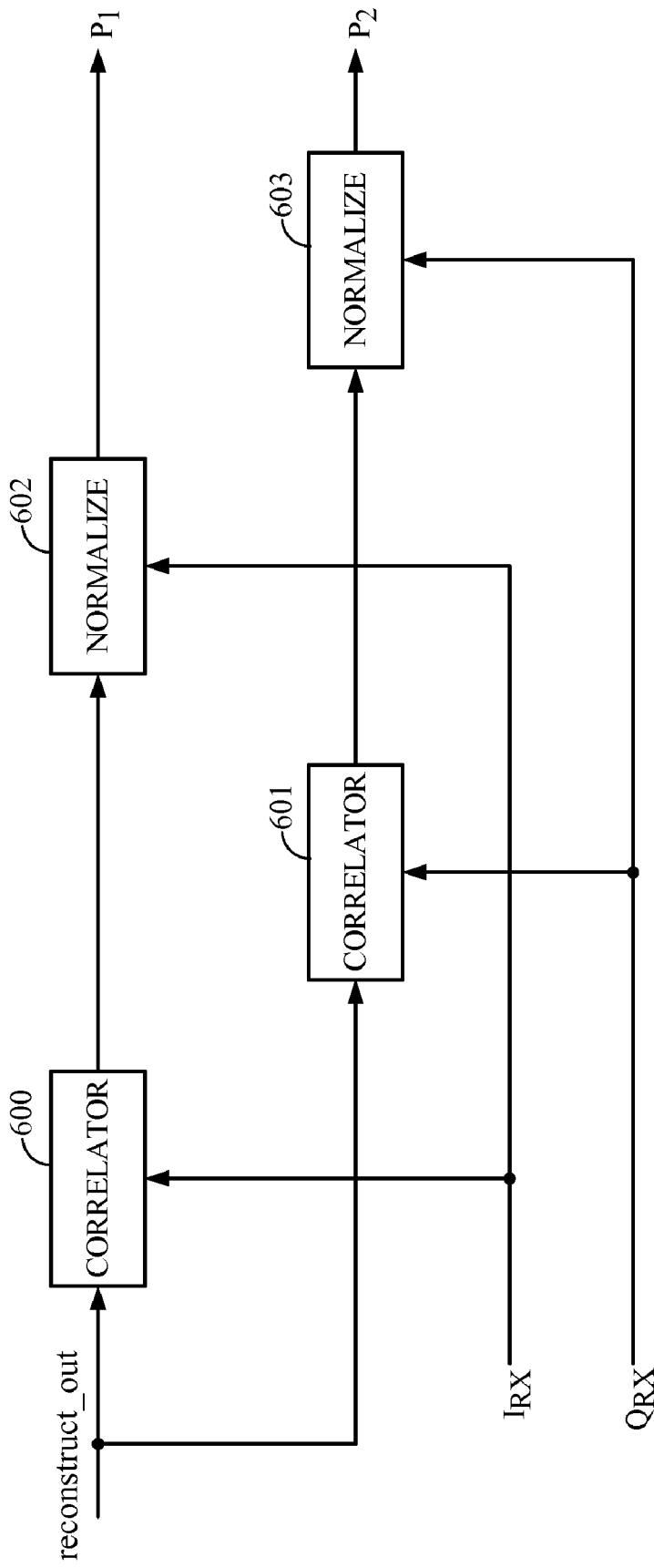
FIG. 6 depicts an exemplary embodiment of interference processing and correlation unit 230 from FIG. 2.

FIG. 6 depicts an exemplary embodiment of interference processing and correlation unit 230 from FIG. 2. The interference processing and correlation unit 230 digitally detects for the presence of reconstructed interference reconstruct_out in the signals $I_{RX}$ and $Q_{RX}$ from FIG. 2. In FIG. 6, two correlation units 600 and 601 correlate $I_{RX}$ and $Q_{RX}$ with the signal reconstruct_out. The outputs of the correlation are normalized by normalization units 602 and 603, and provided to a subsequent stage as $\rho_I$ and $\rho_Q$. Note, for simplicity, the signal reconstruct_out is depicted as a single line (real signal) in FIG. 6. However, in alternative exemplary embodiments, the signal can include two signals (I and Q), each correlated separately with the signals $I_{RX}$ and $Q_{RX}$, respectively.

Figure 6A:
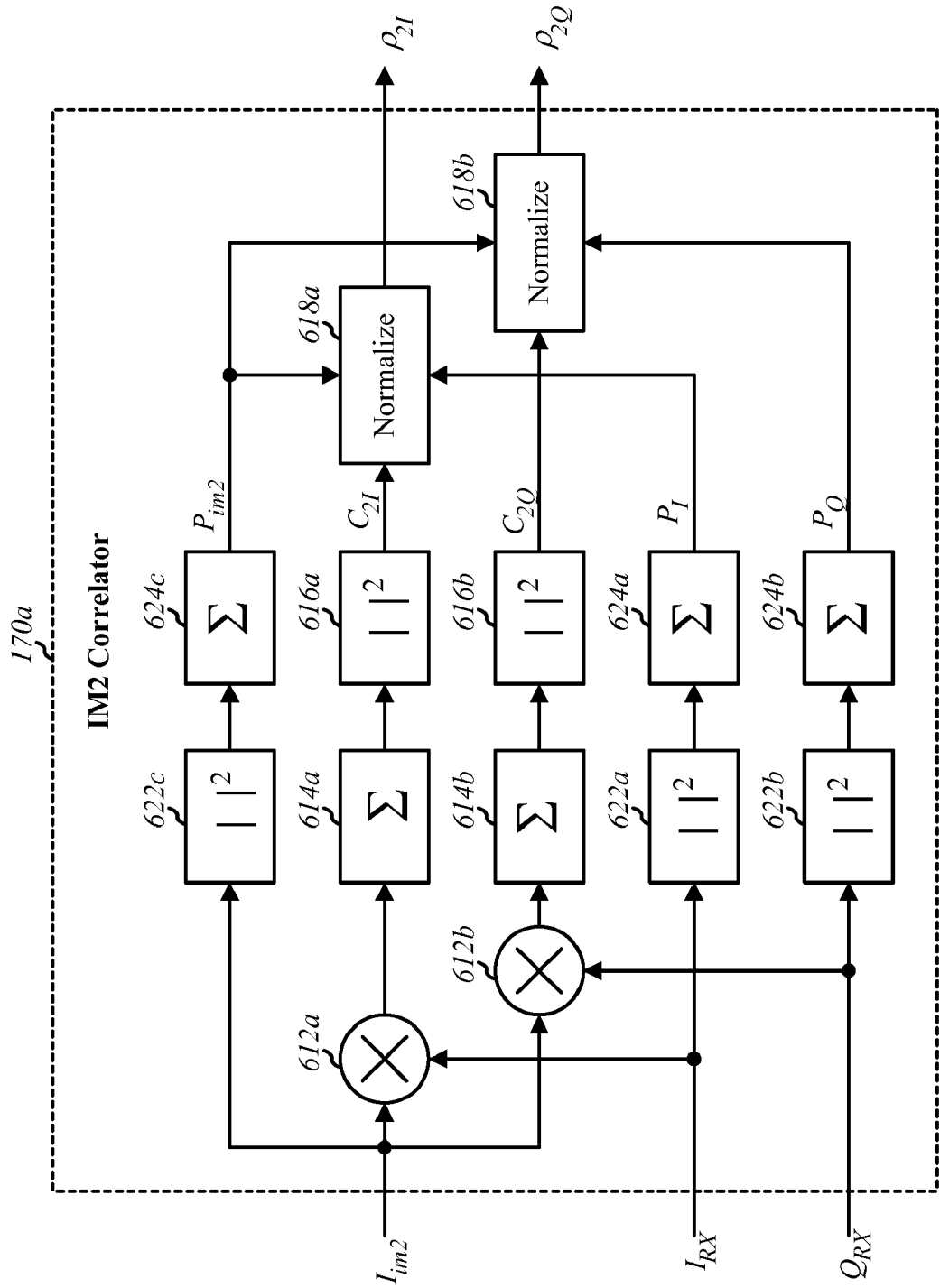

FIG. 6A shows a block diagram of a design of an IM2 correlator 170a that digitally detects for IM2 in the received I and Q signals. IM2 correlator 170a may provide at least part of the functionality of interference processing and correlation unit 230 in FIG. 2. Within IM2 correlator 170a, a multiplier 612a multiplies the input I signal, $I_{RX}$, from digital filter 148 with the reconstructed IM2, $I_{im2}$. A multiplier 612b multiplies the input Q signal, $Q_{RX}$, from digital filter 148 with the reconstructed IM2. Accumulators 614a and 614b accumulate the outputs of multipliers 612a and 612b, respectively. A unit 616a computes the square magnitude of the output of accumulator 614a and provides correlated IM2 I power, $C_{2I}$. A unit 616b computes the square magnitude of the output of accumulator 614b and provides correlated IM2 Q power, $C_{2Q}$. $C_{2I}$ and $C_{2Q}$ are indicative of the amount of correlation between the reconstructed IM2 and the received IM2.

Units 622a and 622b compute the square magnitude of the received I and Q signals, respectively. An accumulator 624a accumulates the output of unit 622a and provides the input I signal power, $P_I$. An accumulator 624b accumulates the output of unit 622b and provides the input Q signal power, $P_Q$. A unit 622c computes the square magnitude of the reconstructed IM2. An accumulator 624c accumulates the output of unit 622c provides the reconstructed IM2 power, $P_{im2}$.

A unit 618a normalizes the correlated IM2 I power, $C_{2I}$, based on the computed powers $P_I$ and $P_{im2}$ and provides a correlation result $\rho_{2I}$ for the I signal. A unit 618b normalizes the correlated IM2 Q power, $C_{2Q}$, based on the powers $P_Q$ and $P_{im2}$ and provides a correlation result $\rho_{2Q}$ for the Q signal. The correlation results for IM2 may be expressed as (Eq 2):

$$\rho_{2I} = \frac{1}{P_I P_{im2}} \cdot \left| \sum_n I_{im2}(n) I_{in}(n) \right|^2,$$

and $$\rho_{2Q} = \frac{1}{P_Q P_{im2}} \cdot \left| \sum_n I_{im2}(n) Q_{in}(n) \right|^2,$$

where $I_{RX}(n)$ and $Q_{RX}(n)$ are the received I and Q signals for sense period n, and $I_{im2}(n)$ is the reconstructed IM2 for sense period n.

Figure 6B:
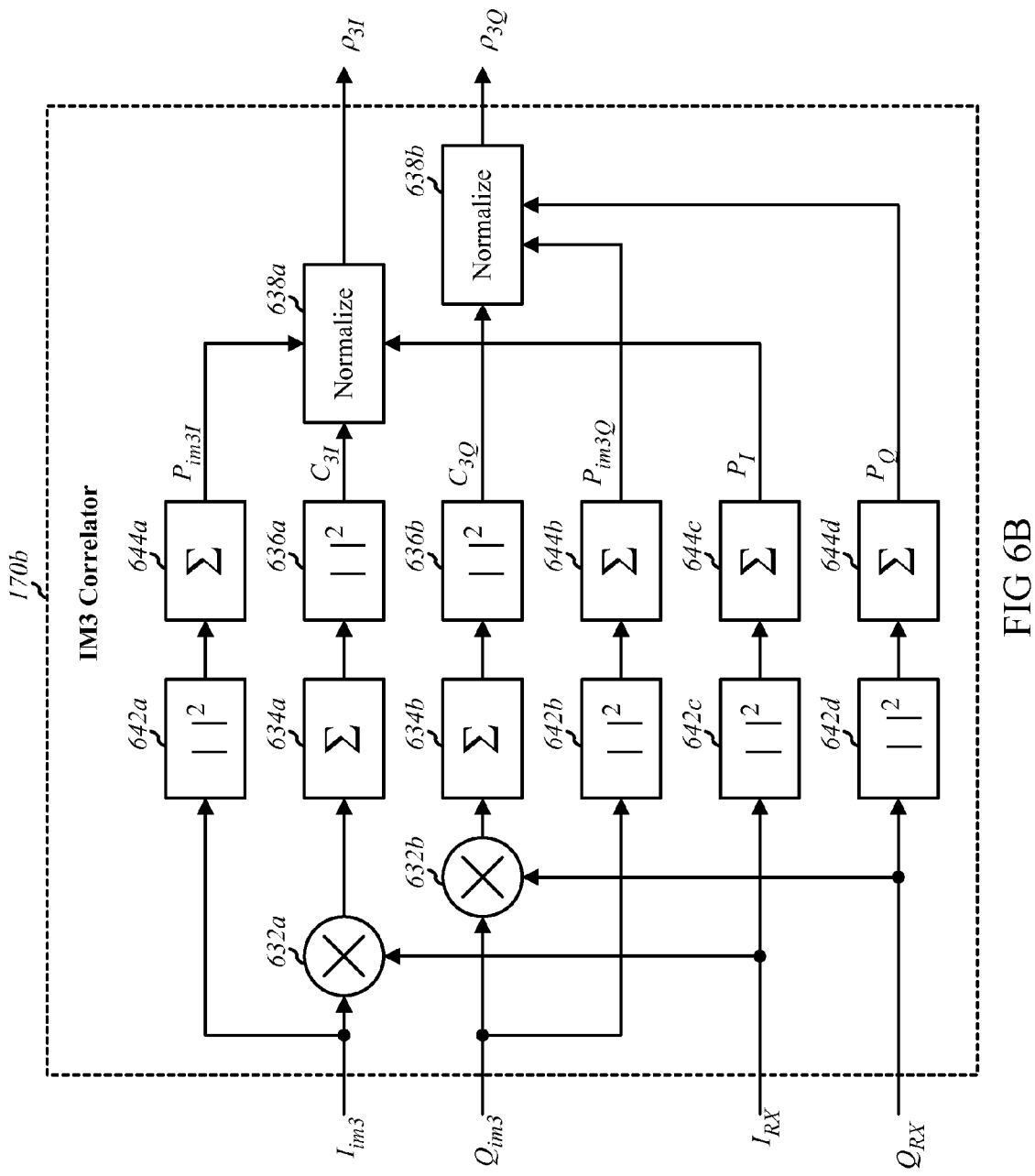

FIG. 6B shows a block diagram of a design of an IM3 correlator 170b that digitally detects for IM3 in the received I and Q signals. IM3 correlator 170b may provide at least part of the functionality of interference processing and correlation unit 230 in FIG. 2. Within IM3 correlator 170b, a multiplier 632a multiplies the received I signal, $I_{RX}$, with the reconstructed IM3 I component, $I_{im3}$. A multiplier 632b multiplies the received Q signal, $Q_{RX}$, with the reconstructed IM3 Q component, $Q_{im3}$. Accumulators 634a and 634b accumulate the outputs of multipliers 632a and 632b, respectively. A unit 636a computes the square magnitude of the output of accumulator 634a and provides correlated IM3 I power, $C_{3I}$. A unit 636b computes the square magnitude of the output of accumulator 634b and provides correlated IM3 Q power, $C_{3Q}$. $C_{3I}$ and $C_{3Q}$ are indicative of the amount of correlation between the reconstructed IM3 and the received IM3. Units 642a and 642b compute the square magnitude of the reconstructed IM3 I and Q components, respectively. An accumulator 644a accumulates the output of unit 642a and provides the reconstructed IM3 I power, $P_{im3I}$. An accumulator 644b accumulates the output of unit 642b and provides the reconstructed IM3 Q power, $P_{im3Q}$. Units 642c and 642d compute the square magnitude of the received I and Q signals, respectively. An accumulator 644c accumulates the output of unit 642c and provides the input I signal power, $P_I$. An accumulator 644d accumulates the output of unit 642d and provides the input Q signal power, $P_Q$.

A unit 638a normalizes the correlated IM3 I power $C_{3I}$ based on the powers $P_I$ and $P_{im3I}$ and provides a correlation result $\rho_{3I}$ for the I signal. A unit 638b normalizes the correlated IM3 Q power $C_{3Q}$ based on the powers $P_Q$ and $P_{im3Q}$ and provides a correlation result $\rho_{3Q}$ for the Q signal. The correlation results for IM3 may be expressed as (Eq 3):

$$\rho_{3I} = \frac{1}{P_I P_{im3I}} \cdot \left| \sum_n I_{im3}(n) I_{in}(n) \right|^2,$$

and $$\rho_{3Q} = \frac{1}{P_Q P_{im3Q}} \cdot \left| \sum_n Q_{im3}(n) Q_{in}(n) \right|^2,$$

where $I_{im3}(n)$ is the reconstructed IM3 I component for sense period n, and $Q_{im3}(n)$ is the reconstructed IM3 Q component for sense period n.

Figure 6C:
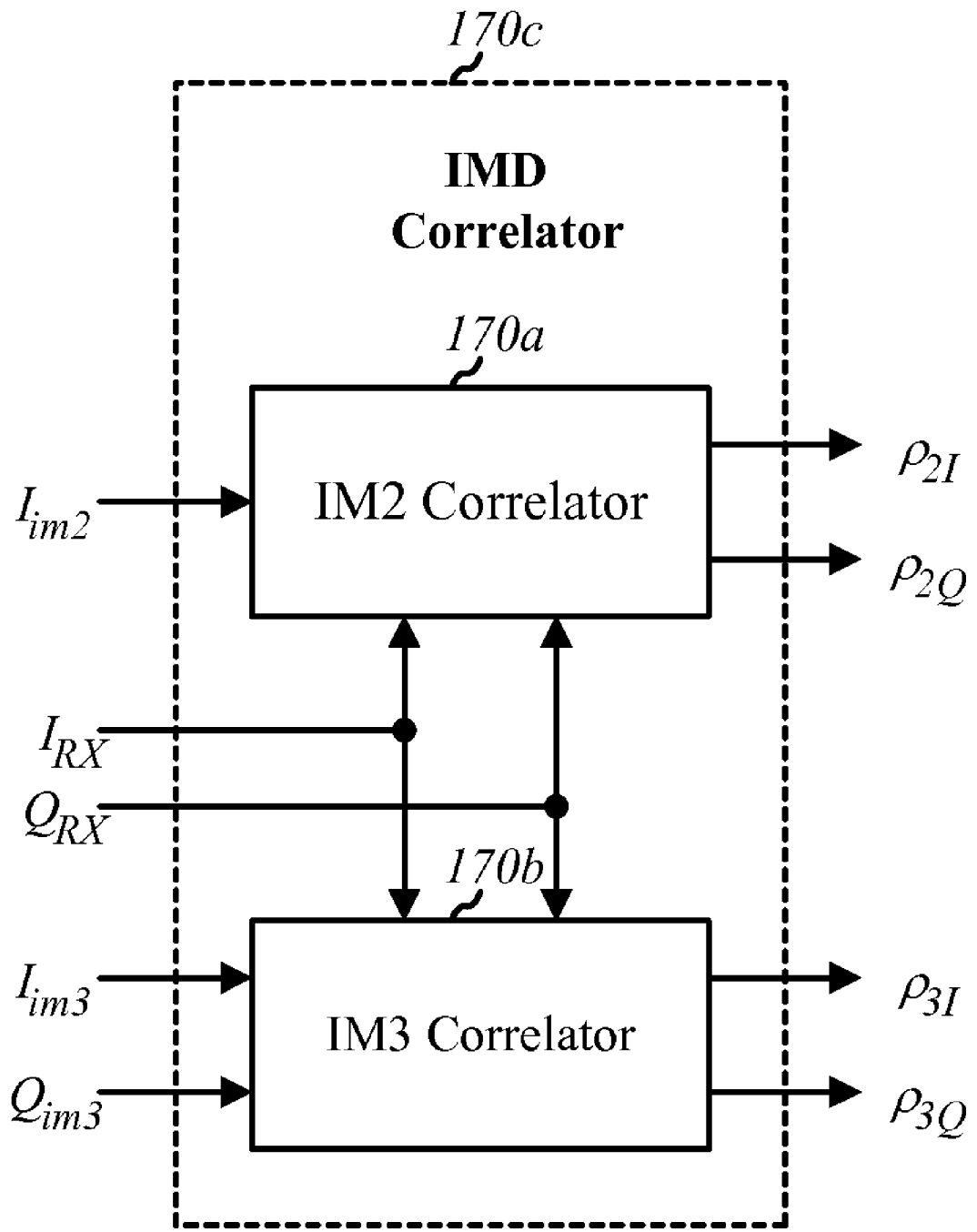

FIG. 6C shows a block diagram of a design of an IMD correlator 170c that digitally detects for IM2 and IM3 in the received I and Q signals. IMD correlator 170c may provide at least part of the functionality of interference processing and correlation unit 230 in FIG. 2. IMD correlator 170c includes IM2 correlator 170a and IM3 correlator 170b. IM2 correlator 170a receives the digital IM2, $I_{im2}$, and the received I and Q signals, $I_{RX}$ and $Q_{RX}$, and generates correlation results $\rho_{2I}$ and $\rho_{2Q}$ for IM2, as described above for FIG. 6A. IM3 correlator 170b receives the digital IM3, $I_{im3}$ and $Q_{im3}$, and the received I and Q signals, $I_{RX}$ and $Q_{RX}$, and generates correlation results $\rho_{3I}$ and $\rho_{3Q}$ for IM3, as described above for FIG. 6B.

FIGS. 6A, 6B and 6C show three specific IMD correlator designs. One of ordinary skill in the art will realize alternative computational operations may be performed to derive the same results as described for FIGS. 6A-6C. One of ordinary skill in the art will further appreciate that the detection of non-IM interference may be performed analogously.

Referring back to FIG. 2, interference control unit 240 receives the correlation results from interference processing and correlation unit 230. Interference control unit 240 may adjust the operation of one or more circuit blocks, as illustrated by the operation of unit 250 and adjustment signal 250a in FIG. 2, based on the detected interference levels. The adjustment may be performed in various manners.

For example, for IM2, interference control unit 240 may adjust the operation of mixer 142 such that the correlation results $\rho_{2I}$ and $\rho_{2Q}$ are acceptable (e.g., less than a minimum threshold). Mixer 142 may include a first mixer for the I path and a second mixer for the Q path. Interference control unit 240 may adjust the symmetry of the first mixer such that the correlation result $\rho_{2I}$ is reduced and may adjust the symmetry of the second mixer such that the correlation result $\rho_{2Q}$ is reduced. Interference control unit 240 may also adjust the operation of LNA 140 and/or other circuit blocks to improve (e.g., reduce) IM2.

In one design, IM2 adjustment is performed in a closed loop manner. Interference control unit 240 may adjust the operation of mixer 142, LNA 140 and/or other circuit blocks in a closed loop manner by (a) monitoring the correlation results $\rho_{2I}$ and $\rho_{2Q}$ after each adjustment, (b) continuing to adjust in the same direction if the correlation results improve (e.g., decrease), and (c) adjusting in the opposite direction if the correlation results worsen (e.g., increase).

In another design, IM2 adjustment is performed based on a threshold. Interference control unit 240 may compare the correlation results $\rho_{2I}$ and $\rho_{2Q}$ against a threshold and declare strong IM2 level if the correlation results are above the threshold. If strong IM2 level is detected, then Interference control unit 240 may adjust the operation of mixer 142, LNA 140, and/or other circuit blocks.

For IM3, interference control unit 240 may adjust the operation of LNA 140, mixer 142, and/or other circuit blocks such that the correlation results $\rho_{3I}$ and $\rho_{3Q}$ are acceptable. For example, the correlation results $\rho_{3I}$ and $\rho_{3Q}$ may be improved (e.g., reduced) by reducing the gain of LNA 140, by using more bias current for LNA 140 and/or mixer 142, by using higher supply voltage for LNA 140 and/or mixer 142, etc. IM3 adjustment may be performed in a closed loop manner, e.g., as described above for IM2. IM3 adjustment may also be performed based on a threshold, e.g., as also described above for IM2.

Figure 7:
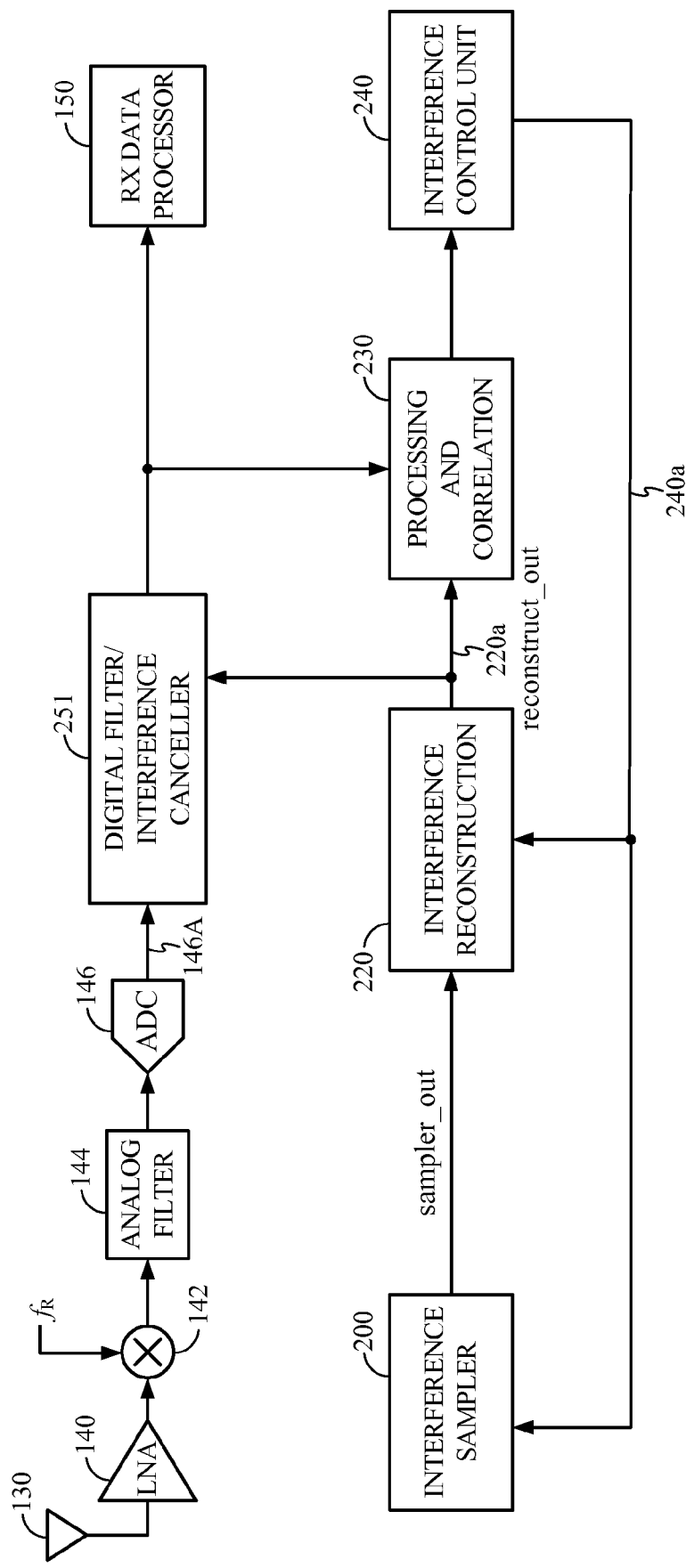
FIG. 7 depicts an exemplary embodiment for cancelling reconstructed interference from a received signal.

FIG. 7 depicts an exemplary embodiment for cancelling reconstructed interference from a received signal. In FIG. 7, a digital filter/IMD canceller 251 receives the digitally reconstructed interference reconstruct_out 220a from interference reconstruction unit 220 and the digital RX signal 146a from ADC 146. Digital filter/IMD canceller 251 filters the received I and Q signals, conditions the digital interference signals to generate signals matching the interference in the received I and Q signals, and further subtracts or cancels the conditioned interference signals from the received I and Q signals. Digital filter/interference canceller 251 may further filter the I and Q signals before or after interference cancellation and provide the signals, $I_{RX}$ and $Q_{RX}$.

Figure 8:
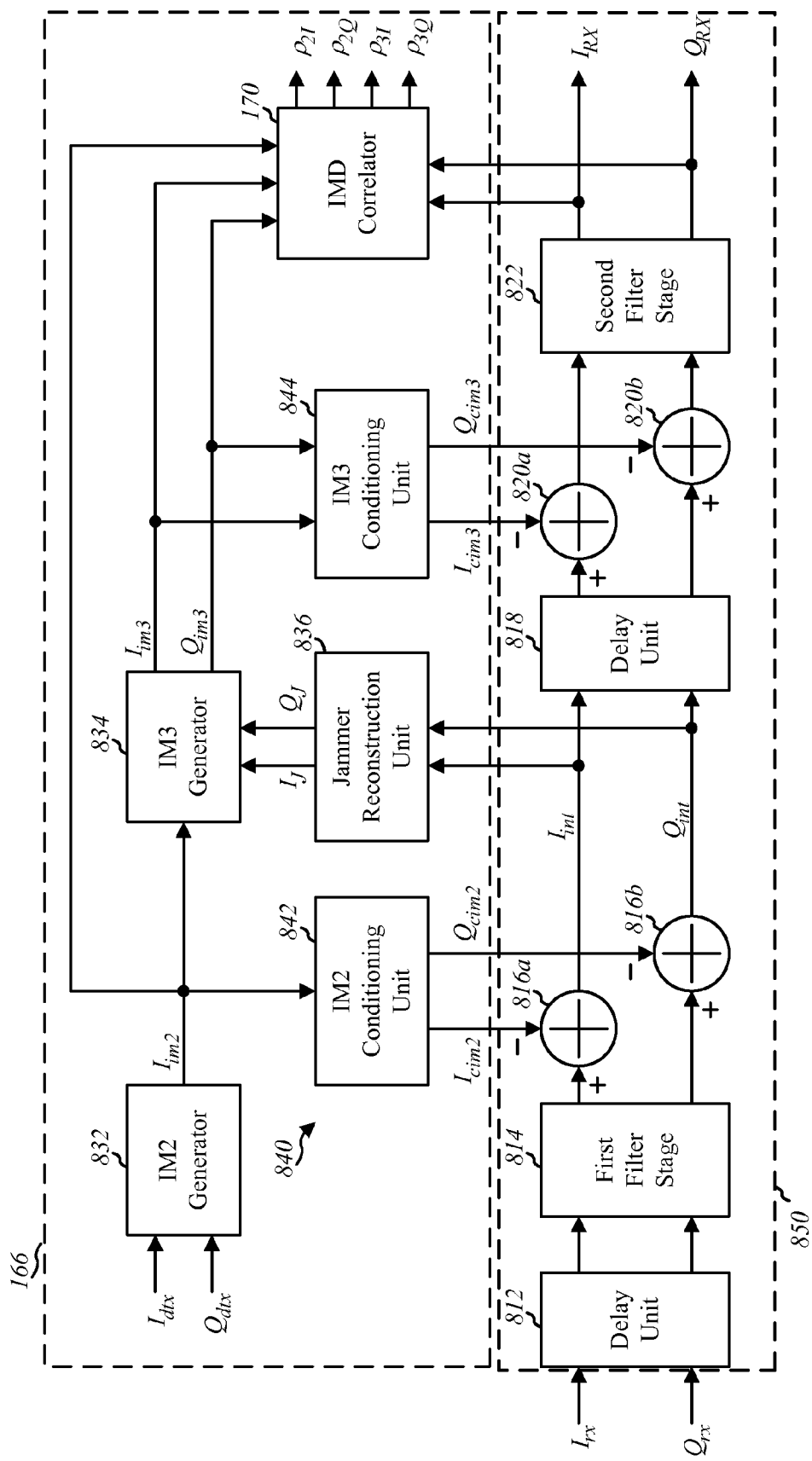
FIG. 8 shows a particular design of an interference cancelling mechanism as depicted in FIG. 7.

FIG. 8 shows a particular design of an interference cancelling mechanism as depicted in FIG. 7. In FIG. 8, IMD generator 166 may provide at least part of the functionality of the interference reconstruction unit 220 in FIG. 7, while IMD canceller 850 may provide at least part of the functionality of the digital filter/interference canceller 251.

In FIG. 8, IMD generator 166 includes an IM2 generator 832 and an IM3 generator 834. IM2 generator 832 receives the sampler_out sub-signal (d), i.e., downconverted I and Q signals $I_{dtx}$ and $Q_{dtx}$, from ADC 156.d, and provides the digital IM2, $I_{im2}$. IM2 generator 832 may be implemented using, e.g., IM2 generator 162 in FIG. 5B, IM2 generator 162b in FIG. 5C, or some other IM2 generator. IM2 conditioning unit 842 receives the digital IM2 from IM2 generator 832 and provides conditioned IM2, $I_{cim2}$ and $Q_{cim2}$.

IM3 generator 834 generates reconstructed digital IM3, $I_{im3}$ and $Q_{im3}$. IM3 generator 834 receives reconstructed digital IM2 from IM2 generator 832, and reconstructed jammer signals from jammer reconstruction unit 836. IM3 generator 834 may be implemented with IM3 generator 580 in FIG. 5E, or any other IM3 generator. IM3 conditioning unit 844 receives the digital IM3 from IM3 generator 834 and provides conditioned IM3, $I_{cim3}$ and $Q_{cim3}$. Units 842 and 844 may be implemented as later described with reference to FIG. 9A.

Jammer reconstruction unit 836 receives the intermediate I and Q signals, $I_{int}$ and $Q_{int}$, from digital filter/interference canceller 850 and provides reconstructed jammer signals, $I_J$ and $Q_J$, to the IM3 generator. Unit 836 may be implemented as earlier described with reference to FIGS. 4D-4E, or as later described with reference to FIG. 9B, or using alternative techniques not explicitly described herein.

Digital filter/IMD canceller 850 includes delay units 812 and 818, a first filter stage 814, and a second filter stage 822. First filter stage 814 may attenuate images and high frequency quantization noise from ADC 146. Second filter stage 822 may perform channel selection, jammer rejection, noise filtering, down sensing, etc. Digital filter/IMD canceller 850 further includes summers 816 and 820 for subtracting the digitally reconstructed interference from the received signal. Delay unit 812 delays the received I and Q signals, $I_{rx}$ and $Q_{rx}$, to match the delays of IM2 generator 832 and IM2 conditioning unit 842. Summer 816a subtracts the conditioned IM2 I component, $I_{cim2}$, from the I output of first filter stage 814 and provides the intermediate I signal, $I_{int}$. Summer 816b subtracts the conditioned IM2 Q component, $Q_{cim2}$, from the Q output of first filter stage 814 and provides the intermediate Q signal, $Q_{int}$. Delay unit 818 delays the intermediate I and Q signals to match the delays of IM3 generator 834 and IM3 conditioning unit 844. Summer 820a subtracts the conditioned IM3 I component, $I_{cim3}$, from the I output of delay unit 818. Summer 820b subtracts the conditioned IM3 Q component, $Q_{cim3}$, from the Q output of delay unit 818. Unit 842 and summers 816a and 816b perform IM2 cancellation. Unit 844 and summers 820a and 820b perform IM3 cancellation.

Note FIG. 8 shows a specific design of interference reconstruction unit 220 and digital filter/interference canceller 251. Interference may also be cancelled in other manners. For example, IM2 and IM3 levels may be detected, IM2 may be canceled prior to IM3 if the IM2 level is higher than the IM3 level, and IM3 may be canceled prior to IM2 if the IM3 level is higher than the IM2 level. One of ordinary skill in the art will appreciate that cancellation architectures for more generalized types of interference may be readily derived in light of the present disclosure.

FIG. 9A shows a block diagram of a design of an IMD conditioning unit 900. Unit 900 may provide at least part of the functionality of IM2 conditioning unit 842 in FIG. 8, in which case unit 900 would receive the digital IM2, $I_{im2}$ and $Q_{im2}$, for the I and Q inputs and provide the conditioned IM2, $I_{cim2}$ and $Q_{cim2}$. Unit 900 may also provide at least part of the functionality of IM3 conditioning unit 844, in which case unit 900 would receive the digital IM3, $I_{im3}$ and $Q_{im3}$, for the I and Q inputs and provide the conditioned IM3, $I_{cim3}$ and $Q_{cim3}$.

Within IMD conditioning unit 900, gain units 910a and 910b scale the I and Q inputs with gains $g_I$ and $g_Q$, respectively. Filters 912a and 912b filter the outputs of gain units 910a and 910b, respectively, with adjustable filter responses. Delay units 914a and 914b delay the outputs of filters 912a and 912b, respectively, by variable amounts of delay. Filters 916a and 916b filter the outputs of delay units 914a and 914b, respectively, with adjustable filter responses and provide the conditioned IM2 or IM3.

In an exemplary embodiment, interference control unit 240 in FIG. 7 may receive correlation results for the reconstructed interference, and may adjust various units within an IMD conditioning unit 900 such that the conditioned IM2 and IM3 match the received IM2 and IM3, respectively, as closely as possible. Gains $g_I$ and $g_Q$ may be selected such that the amplitude of the conditioned IM2 or IM3 matches the amplitude of the received IM2 or IM3. Filters 912a, 912b, 916a and 916b may be adjusted such that the frequency response of the conditioned IM2 or IM3 matches the frequency response of the received IM2 or IM3. For example, filters 912a and 912b may provide a roll-off or droop in the conditioned IM2 or IM3 to match a droop in the received I and Q signals due to various circuit blocks in the receive path. Delay units 914a and 914b may be adjusted such that the conditioned IM2 or IM3 is time aligned with the received IM2 or IM3. Interference control unit 240 may cycle through all adjustable parameters (e.g., gain, delay, frequency response, etc.) and may adjust one parameter at a time. For each parameter, Interference control unit 240 may apply different values and select the value that provides the lowest correlation results, which indicate better IMD cancellation. Interference control unit 240 may also adjust multiple or all parameters jointly.

In another design, an IMD conditioning unit is implemented with adaptive filters having coefficients that may be adjusted based on the correlation results. For example, an adaptive filter may receive $I_{im3}$ and generate $I_{cim3}$ based on a set of coefficients that may be adjusted based on correlation result $\rho_{3I}$. Adaptive filters may also be used to generate $I_{cim2}$, $Q_{cim2}$ and $Q_{cim3}$. The coefficient adjustment for the adaptive filters may be based on various adaptive algorithms such as least mean square (LMS), recursive least square (RLS), direct matrix inversion (DMI), etc. In an exemplary embodiment, such adaptive algorithms may seek to minimize a cost function based on the correlation values provided by unit 170 in FIG. 8. In alternative exemplary embodiments, the cost function may be a measure of receiver performance, e.g., frame error rate.

FIG. 9B shows a block diagram of a design of a jammer reconstruction unit 930. Unit 930 may provide at least part of the functionality of the jammer reconstruction unit 836 in FIG. 8. Within unit 930, gain units 920a and 920b receive and scale the intermediate I signal, $I_{int}$. Gain units 920c and 920d receive and scale the intermediate Q signal, $Q_{int}$. Gain units 920a through 920d may be used to correct I/Q amplitude and phase imbalance of the jammer. A summer 922 sums the scaled $I_{int}$ from unit 920a and the scaled $Q_{int}$ from unit 920c. A summer 922b sums the scaled $I_{int}$ from unit 920b and the scaled $Q_{int}$ from unit 920d. A filter 924a filters the output of summer 922 and provides the jammer I signal, $I_j$. A filter 924b filters the output of summer 922b and provides the jammer Q signal, $Q_j$. Filters 924a and 924b may be low-pass or band-pass filters designed to "undroop" (i.e., equalize) the reconstructed jammer I and Q signals to compensate for droop in the frequency response of the received path. In an exemplary embodiment, filters 924a and 924b may precede, rather than follow, the gain units 920a through 920d shown.

Note while some techniques for reconstructing, correlating, and/or cancelling interference have been described with specific reference to their application to IM2 and IM3, one of ordinary skill in the art will appreciate that the techniques disclosed may be readily adapted to be applied to other types of interference, such as those later described with reference to FIGS. 11-12. Such exemplary embodiments are contemplated to be within the scope of the present disclosure.

Figure 10:
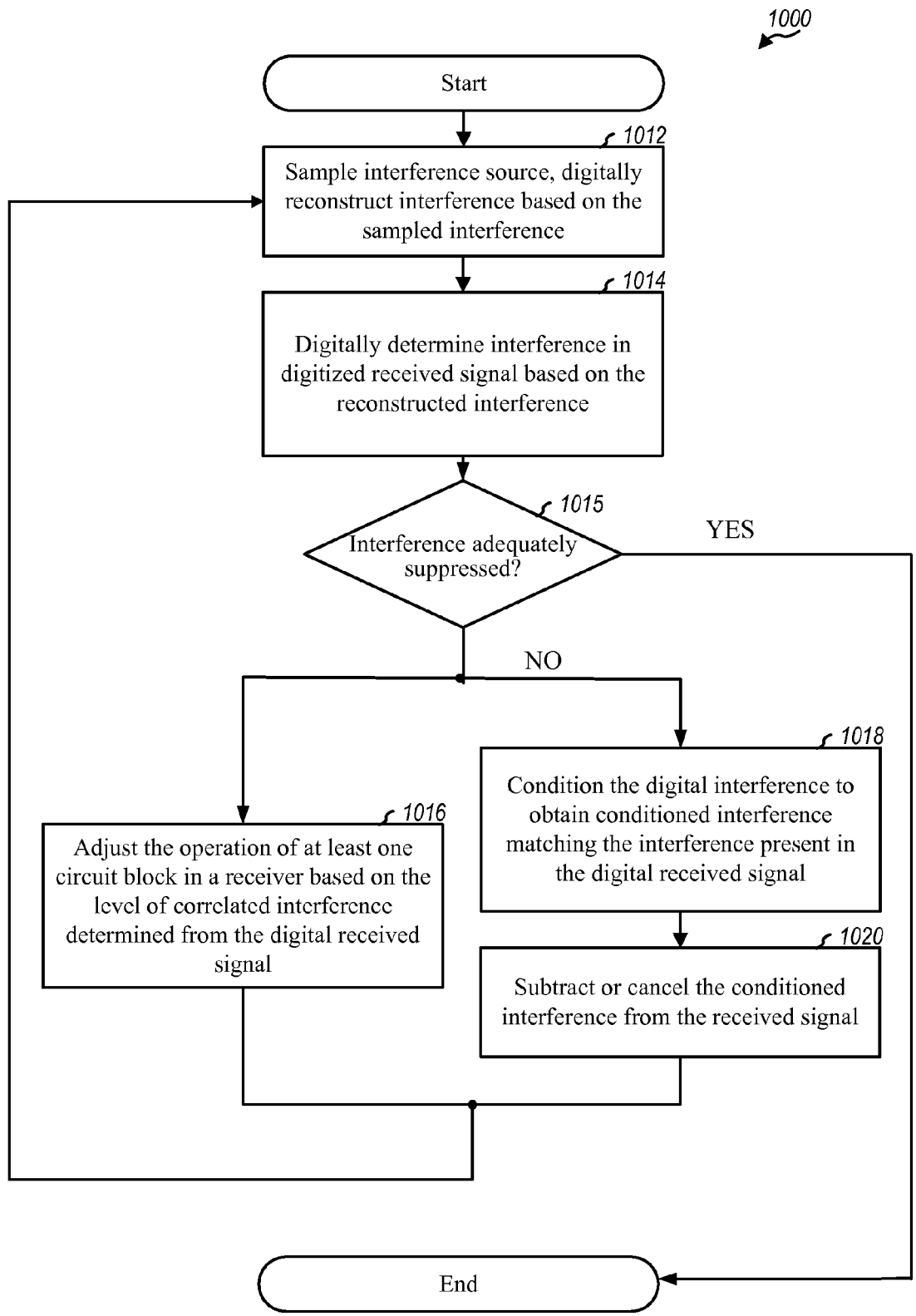
FIG. 10 shows a process 1000 for detecting and mitigating interference by a device, e.g., a wireless device such as a cellular phone.

FIG. 10 shows a process 1000 for detecting and mitigating interference by a device, e.g., a wireless device such as a cellular phone. The device samples an interference source, digitally reconstructs interference based on the sampled interference (step 1012), and digitally determines interference in an input signal based on the reconstructed interference (step 1014). For example, the device may obtain digital IM2 and determine IM2 in the input signal based on the digital IM2. Alternatively or additionally, the device may obtain digital IM3 and determine IM3 in the input signal based on the digital IM3. The sampled interference may be sensed from any source such as shown in FIGS. 3A-3C. At step 1012, the device may digitally reconstruct the interference based on any of the sampler_out sub-signals shown in FIGS. 3A-3C.

At step 1014, the device may correlate the digital reconstructed interference with the digital received signal and determine the levels of interference in the digital received signal based on correlation results. For example, for IM2, the device may correlate the digital IM2 with the received I and Q signals to obtain correlated IM2 I and Q powers, determine the power of the digital IM2, determine the powers of the received I and Q signals, and determine the correlation results for IM2 based on all of the powers, e.g., as shown in FIG. 6A. For IM3, the device may correlate the digital IM3 I component with the input I signal to obtain correlated IM3 I power, correlate the digital IM3 Q component with the input Q signal to obtain correlated IM3 Q power, determine the powers of the digital IM3 I and Q components, determine the powers of the received I and Q signals, and determine the correlation results for IM3 based on the all of the powers, e.g., as shown in FIG. 6B.

At step 1015, the device may determine whether the interference as been suppressed to a sufficient degree. If YES, the device may proceed to the END, whereby the method is suspended. In an exemplary embodiment, the method may be periodically executed. If NO, the device may proceed along one or both of the paths defined by steps 1016 and steps 1018-1020.

At step 1016, the device may adjust the operation of at least one circuit step in a receiver based on the level of correlated interference determined from the digital received signal. The adjustments may be based on the correlation results, as described above. For example, the device may adjust the operation of a mixer in the receiver based on the determined IM2, adjust the gain and/or linearity of an LNA in the receiver based on the determined IM3, etc. The device may perform the adjustment in a closed loop manner, based on a threshold, etc.

Alternatively or additionally, the device may condition the digital interference to obtain conditioned interference matching the interference present in the digital received signal (step 1018), and may subtract or cancel the conditioned interference from the received signal (step 1020). For example, the device may derive conditioned IM2 based on the digitally reconstructed IM2 and subtract the conditioned IM2 from the input signal. The device may also derive conditioned IM3 based on the digitally reconstructed IM3 and subtract the conditioned IM3 from the input signal. The device may derive conditioned IM2 and/or IM3 with variable gain, variable delay, adjustable frequency response, etc., to achieve satisfactory cancellation of IM2 and/or IM3. The device may also derive conditioned interference based on any digital interference reconstructed from a sub-signal of sampler_out shown in FIGS. 3A-3C.

The digital interference may thus be used to (a) adjust the operation of at least one circuit block in the receiver, as shown at step 1016, (b) derive conditioned interference and cancel the conditioned interference from the received signal, as shown at steps 1018 and 1020, or (c) both adjust the operation of at least one circuit block as well as derive conditioned interference and cancel the conditioned interference from the received signal.

Upon conclusion of step 1016 and/or steps 1018-1020, the method may return to step 1012 to sample the interference source again. Alternatively, in an exemplary embodiment (not shown), the method may return to step 1015, while steps 1012 and 1014 are executed continuously in the background.

FIGS. 11A-11C and 12A-12C show further specific applications of the general architecture of FIG. 2 to exemplary embodiments for cancelling particular interference sources present in a received signal. Note the exemplary embodiments depicted are intended to serve as illustrations only, and are not meant to limit the scope of the general architecture of FIG. 2 to any particular scheme disclosed.

Figure 11A:
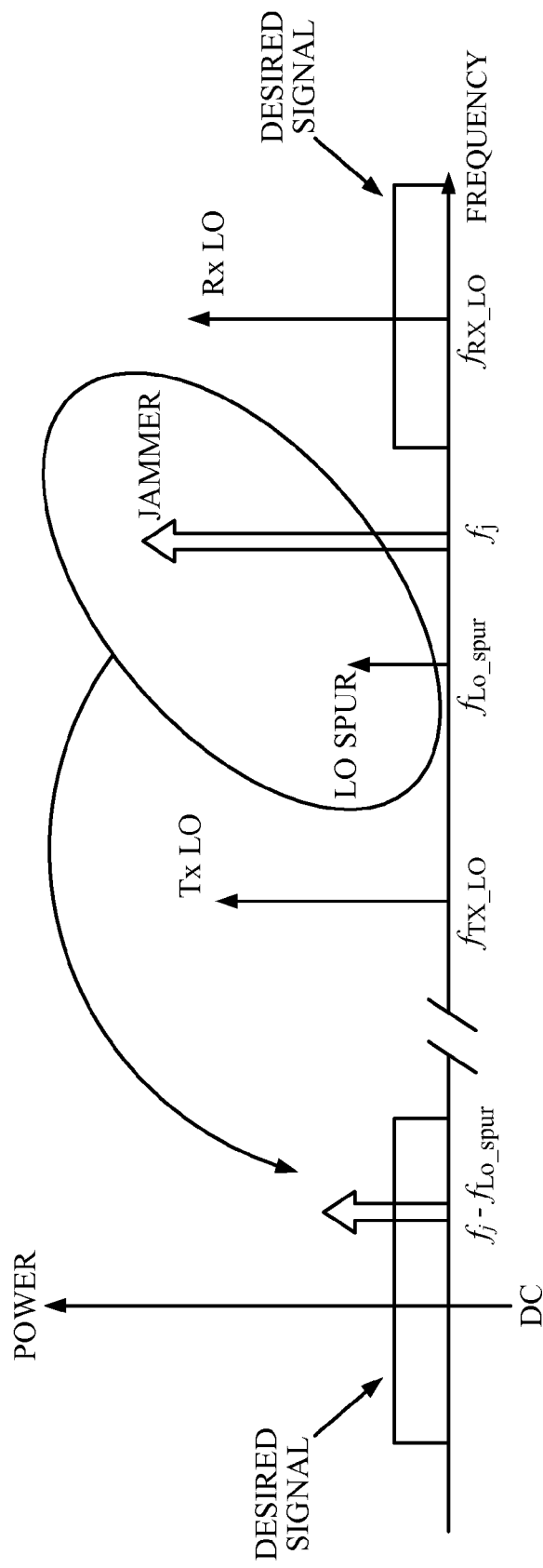
FIG. 11A depicts a scenario wherein a jammer is at a frequency $f_j$, and an LO spur of frequency $f_{LO\_spur}$ is present at the input to mixer 142.

FIG. 11A depicts a scenario wherein a jammer is at a frequency $f_j$, and an LO spur of frequency $f_{LO\_spur}$ is present at the input to mixer 142. The LO spur may be a spur generated by the RX LO itself, or it may be a spur of the TX LO that leaks into the input of the mixer 142 by coupling through the substrate or other circuitry. Note the LO spur downconverts the jammer to baseband frequency $|f_j-f_{LO\_spur}|$, where it causes interference to the desired signal.

Figure 11B:
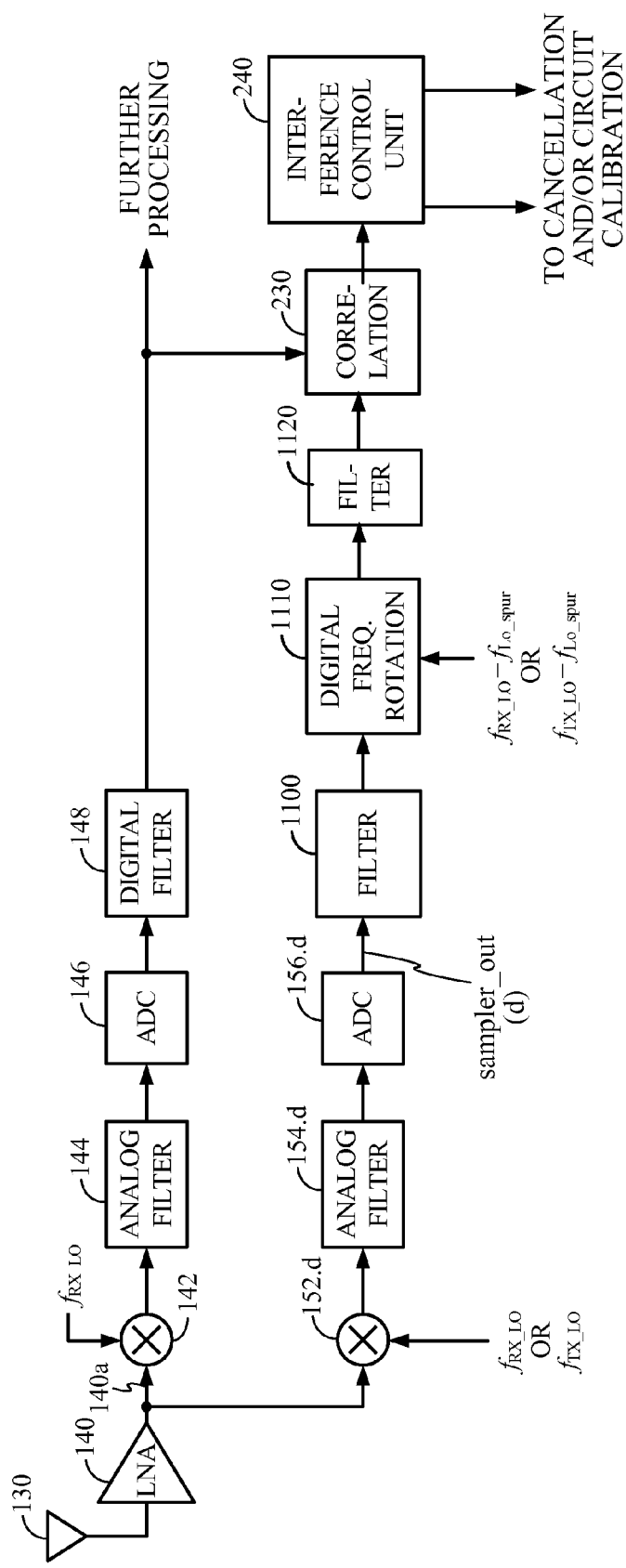
FIG. 11B depicts an exemplary embodiment according to the present disclosure for digitally reconstructing the interference due to the mixing of the jammer with the LO spur, assuming the frequency $f_{LO\_spur}$ is known a priori.

FIG. 11B depicts an exemplary embodiment according to the present disclosure for digitally reconstructing the interference due to the mixing of the jammer with the LO spur, assuming the frequency $f_{LO\_spur}$ is known a priori. In FIG. 11B, the receive chain corresponding to sampler_out sub-signal (d) is employed to mix the LNA output 140a to baseband. The mixer 152.d is provided with an LO at frequency $f_{RX\_LO}$ or $f_{TX\_LO}$, depending on whether the downconverted jammer is expected to be mixed with the RX LO or the TX LO. The output of mixer 152.d contains a version of the jammer centered at $f_j$ frequency-shifted to a new center frequency of $(f_j-f_{RX\_LO})$ or $(f_j-f_{TX\_LO})$ Following digitization by ADC 156.d, the sampler_out sub-signal (d) is provided to a filter 1100 and a digital frequency rotator 1110, which can be considered specific exemplary embodiments of interference reconstruction unit 220 in FIG. 2.

In an exemplary embodiment, the digital filter 1100 is designed to provide ADC output noise filtering, or to compensate for the characteristics of analog filter 154.d. Note alternative exemplary embodiments need not incorporate a digital filter 1100. Digital frequency rotator 1110 may be designed to shift or rotate the remaining signal by a frequency $(f_{RX_{LO}}-f_{LO\_spur})$ or $(f_{TX\_LO}-f_{LO\_spur})$. The frequency rotation reconstructs a digital version of the interference caused to the received signal by the mixing of the jammer with the LO spur. In an alternative exemplary embodiment, frequency shifting may also be accomplished by multiplying the digitized jammer, now at frequency $(f_j-f_{RX\_LO})$ or $(f_j-f_{TX\_LO})$, with a locally generated version of the LO spur at frequency $(f_{RX\_LO}-f_{LO\_spur})$ or $(f_{TX\_LO}-f_{LO\_spur})$. Note techniques for digital frequency rotation are well-known in the art and are not described further herein.

Following the digital frequency rotator 1110, a filter 1120 may be applied to isolate the interference before supplying it to correlation unit 230 and interference control unit 240, whose operation may be as described previously herein. In an exemplary embodiment, filter 1120 may be a bandpass filter centered at the expected interference frequency. Optionally, the output of interference control unit 240 may be provided to an interference cancellation mechanism or calibration mechanism to adjust LO spurs, if available. Such a mechanism may be, e.g., a module to increase the bias current provided to a local oscillator to reduce spurs.

Figure 11C:
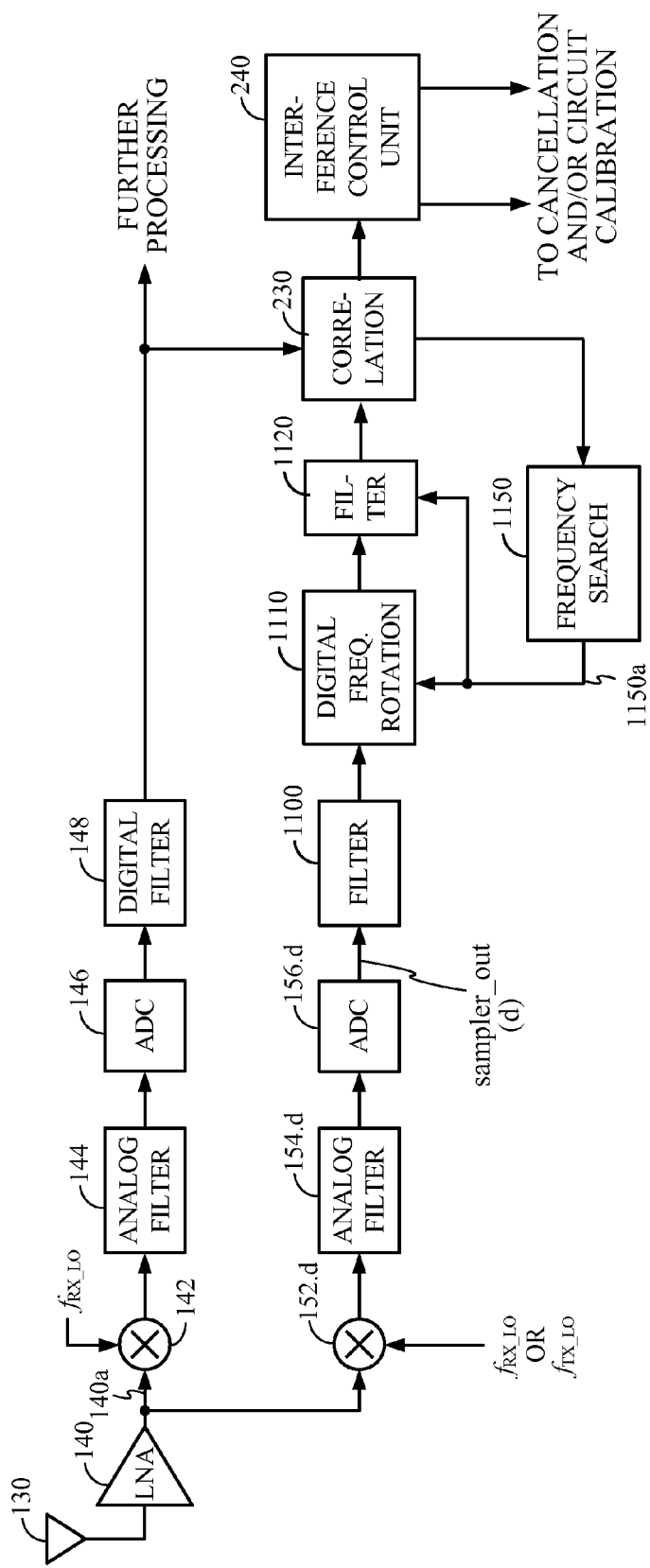
FIG. 11C depicts an exemplary embodiment according to the present disclosure for digitally reconstructing the interference due to the jammer at $f_j$, wherein the frequency $f_{LO\_spur}$ is not known a priori.

FIG. 11C depicts an exemplary embodiment according to the present disclosure for digitally reconstructing the interference due to the jammer at $f_j$, wherein the frequency $f_{LO\_spur}$ is not known a priori. In FIG. 11C, an additional frequency search unit 1150 is provided. The frequency search unit 1150 may instruct the digital frequency rotator 1110 to rotate a signal by a candidate frequency 1150a to generate a candidate reconstructed interference, filter the rotated signal using a band-pass filter centered at the candidate frequency 1150a, and collect a corresponding correlation coefficient computed by correlation unit 230. The frequency search unit 1150 may thus iterate over a range of candidate frequencies until a best candidate frequency generating a maximum correlation is determined. The best candidate frequency may then be used to cancel or calibrate the interference, as disclosed herein. In an exemplary embodiment, the candidate frequency may be continually monitored and updated during normal operation of the receiver.

One of ordinary skill in the art will realize that further variations of the architectures depicted in FIGS. 11B-11C are possible. For example, sampler_out sub-signals (b) and (c) may be provided instead of the sub-signal (d) depicted in FIGS. 11B-11C. Alternatively, sampler_out sub-signal (a) may be digitally filtered (e.g., band-pass filtered) to isolate te jammer, then digitally rotated by the frequency $(f_{LO\_spur}-f_{RX\_LO})$ to obtain the interference expected to be present in the RX signal.

Figure 12A:
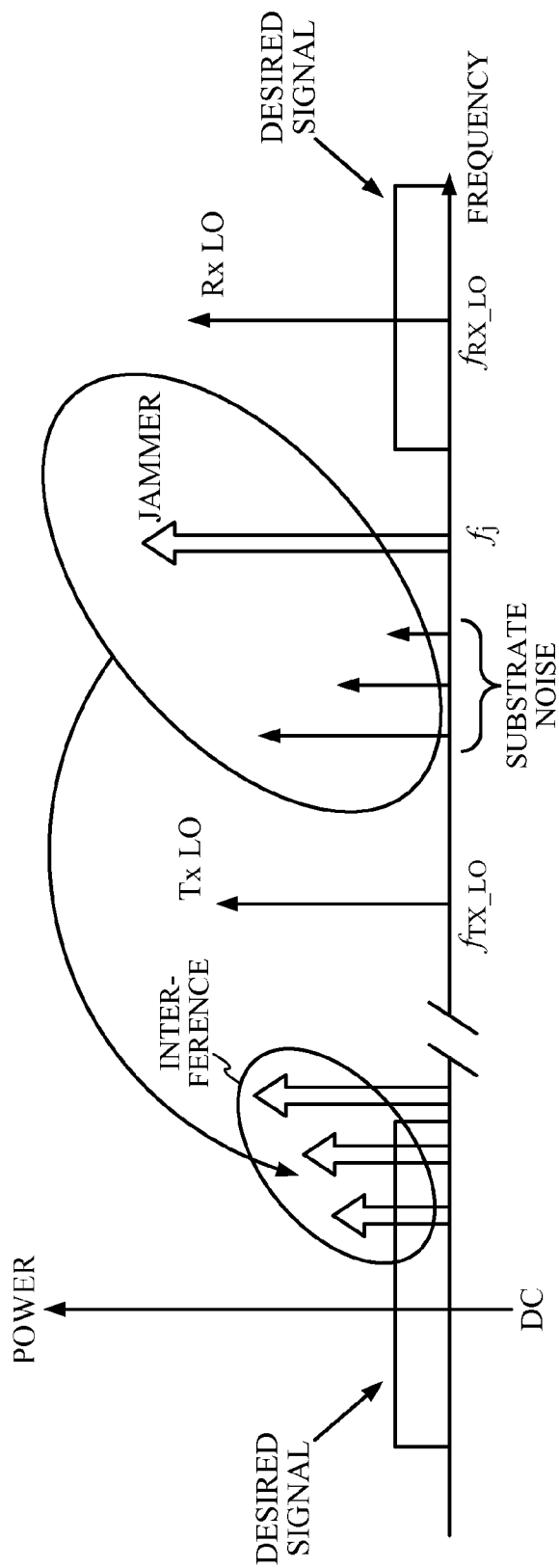
FIG. 12A depicts a scenario wherein a jammer is present at a frequency $f_j$, and substrate noise is coupled to the LO port of mixer 142.

FIG. 12A depicts a scenario wherein a jammer is present at a frequency $f_j$ in the vicinity of the RX LO, and high-frequency substrate noise also in the vicinity of the RX LO is coupled to the LO port of mixer 142. The substrate noise downconverts the jammer to baseband as shown, where it may cause interference to the desired signal.

Figure 12B:
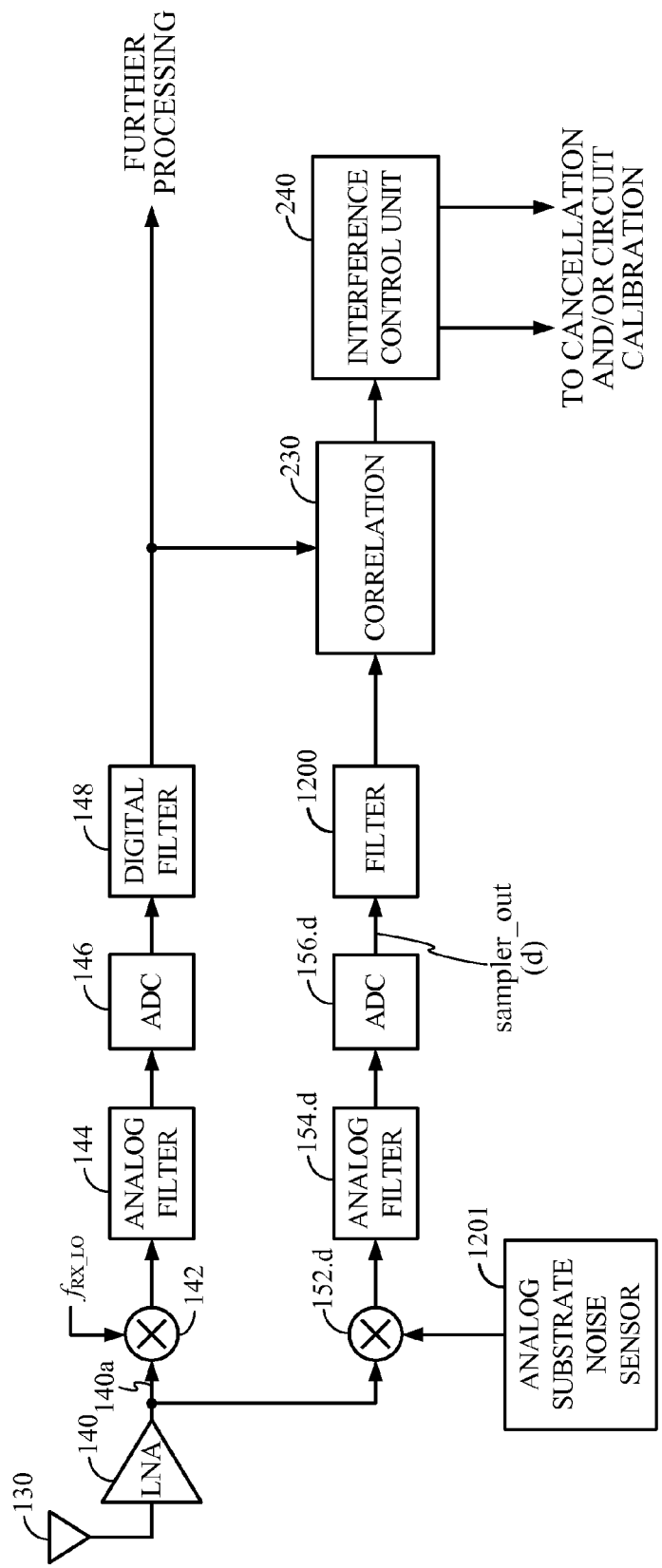
FIG. 12B depicts an exemplary embodiment according to the present disclosure for digitally reconstructing the interference due to the jammer at $f_j$ being mixed with substrate noise.

FIG. 12B depicts an exemplary embodiment according to the present disclosure for digitally reconstructing the interference due to the jammer at $f_j$ being mixed with high-frequency substrate noise. In FIG. 12B, it is assumed that the high-frequency substrate noise couples into the RX LO and thus downconverts the LNA signal. To mitigate this effect, sampler_out sub-signal (d) is generated by mixing the LNA output with the output of analog substrate noise sensor 1201 using mixer 152.d, i.e., x.d is set to a substrate noise sensor output, e.g., according to FIG. 3D. Sampler_out sub_signal (d) may be filtered by digital filter 1200 to remove noise from the ADC output, and then provided to correlation unit 230 and interference control unit 240 according to the present disclosure.

One of ordinary skill in the art will realize that while FIG. 12B depicts a technique for addressing the effects of high-frequency substrate noise that couples to the LO port of the mixer to downconvert a received signal to baseband, in an alternative exemplary embodiment (not shown), the present techniques may also be applied to high-frequency substrate noise that directly couples to the RF input (i.e., received signal input) of the mixer 142. In such an exemplary embodiment, signal sensor 300 in FIG. 3C may be configured to sense the substrate noise. The signal sensor 300 output may then be downconverted by a mixer 152.k using the RX LO, prior to being filtered by filter 154.k and digitized by ADC 156.k. The digitized substrate noise may subsequently be correlated with or canceled from the received signal, using the techniques already described. In an exemplary embodiment, the filter 154.k may be a bandpass filter, and the ADC 156.k may be a bandpass ADC known to one of ordinary skill in the art.

Figure 12C:
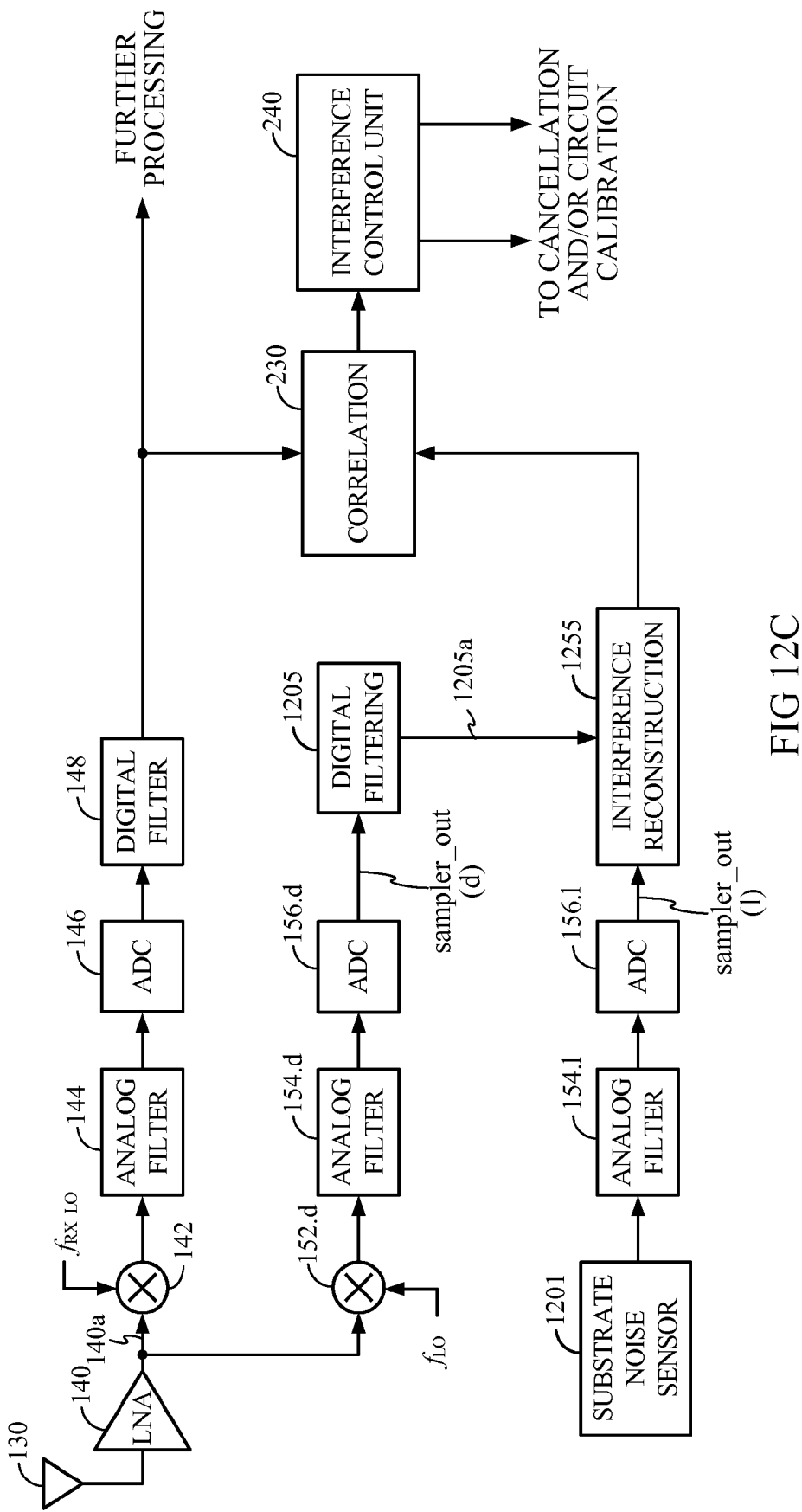
FIG. 12C depicts an exemplary embodiment according to the present disclosure wherein sampler_out comprises two sub-signals (d) and (l) for digitally reconstructing the interference due to a jammer being mixed with substrate noise.

FIG. 12C depicts an exemplary embodiment according to the present disclosure wherein sampler_out comprises two sub-signals (d) and (l) for digitally reconstructing the interference due to a jammer being mixed with substrate noise. In FIG. 12C, sampler_out sub-signal (d) is a digitized version of the LNA output 130a downconverted by a high-frequency local oscillator signal, e.g., the RX LO. Sampler_out sub-signal (d) is provided to digital filter 1205, which may have a band-pass filter characteristic tuned to the frequency of the downconverted jammer. Filter 1205 may thus function to isolate the jammer. One of ordinary skill in the art will realize that other units besides digital filter 1205, such as a digital frequency rotation unit plus accompanying filter earlier described with reference to FIG. 11B, may be employed in the exemplary embodiment of FIG. 12C. In an alternative exemplary embodiment (not shown), if the frequency of the jammer is unknown, jammer frequency search techniques, e.g., as described with reference to FIG. 11C, may be employed.

Further depicted in FIG. 12C is a substrate noise sensor 1201. As will be further described herein, the exemplary embodiment of FIG. 12C may be used to sense and reconstruct interference due to substrate noise of both a high-frequency nature (e.g., comparable to the frequency of the LO) and a low-frequency nature (e.g., much less than the frequency of the LO).

If the substrate noise is of a relatively high frequency, the analog filter 154.l may be configured as a band-pass analog filter, and the ADC 156.l may be a bandpass ADC (capable of performing bandpass sensing and digitization). If the substrate noise is of a relatively low frequency (e.g., much lower than the frequency of the RX LO), but has been upconverted to a higher frequency (e.g., by the RX LO) so that the substrate noise mixes with the received signal, then substrate noise sensor 1201 may directly sample the low-frequency substrate noise. In that case, analog filter 154.l may be configured as a low-pass filter, and the ADC 156.l may be a normal ADC.

In both cases of addressing naturally high frequency substrate noise as well as upconverted low frequency substrate noise, the interference reconstruction unit 1255 may digitally reconstruct the interference due to the jammer and the substrate noise by, e.g., digitally multiplying the signal sampler_out (l) with the signal 1205a, and correcting for any necessary frequency shift.

While FIGS. 12A-12C have depicted substrate noise that is high in frequency, e.g., close to the RX LO as shown in FIG. 12A, or upconverted in frequency, one of ordinary skill in the art will appreciate that substrate noise can also be at a fairly low frequency, interfering with the received signal after the Rx LO has downconverted both desired signal and Jammer to low frequencies. For example, the substrate noise could be coupled with the clock of the ADC 146, which would act to translate a jammer centered at $(f_j-f_{RX\_LO})$ after the analog filter 144 directly into the desired channel.

Figure 12D:
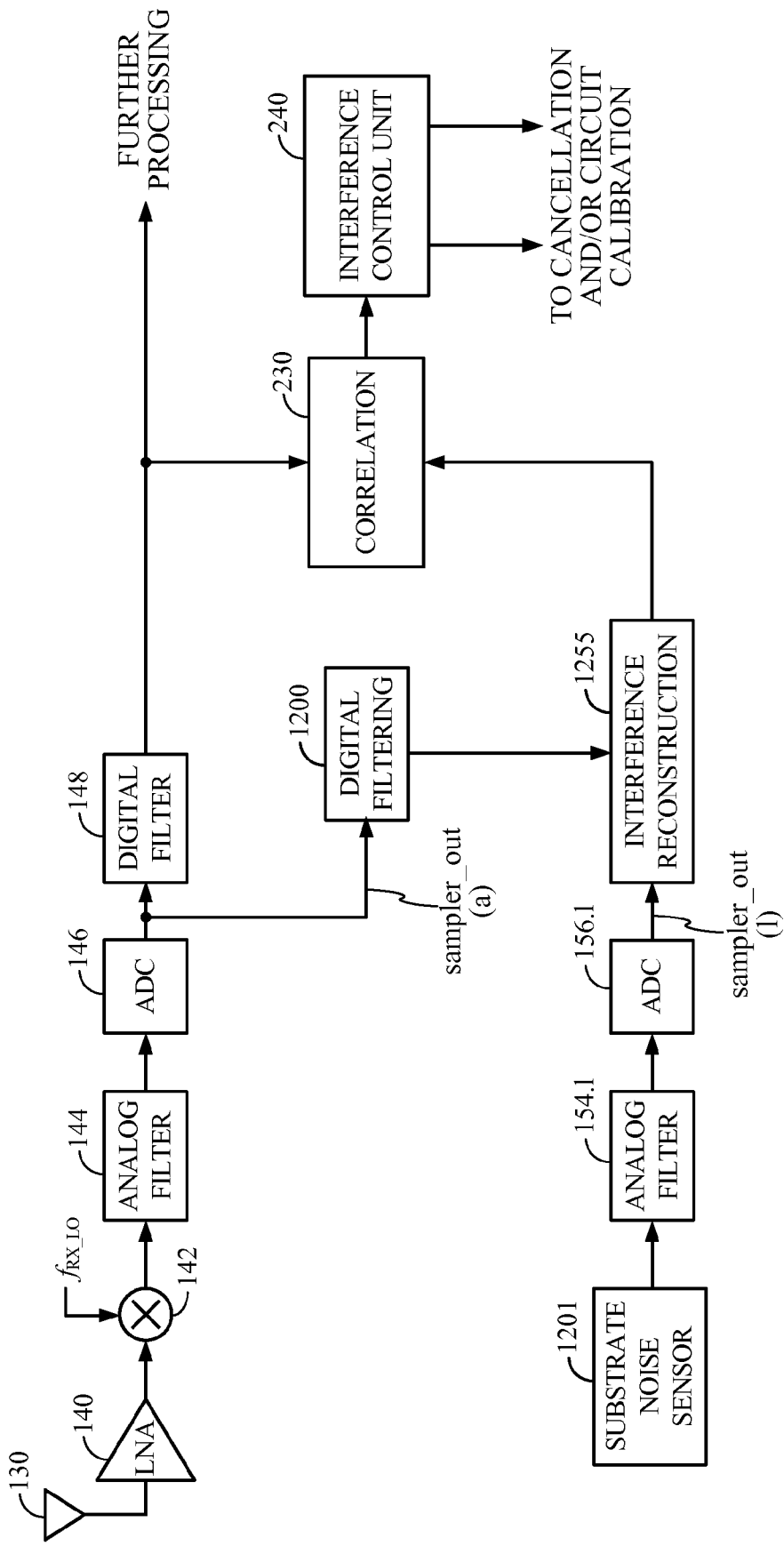
FIG. 12D depicts an exemplary embodiment for addressing substrate noise that is relatively low in frequency.

FIG. 12D depicts an exemplary embodiment for addressing substrate noise that is relatively low in frequency. In FIG. 12D, the sampler_out sub-signal (a) is a digitized and filtered version of the ADC 146 output. In an exemplary embodiment, the filter 1200 may isolate the jammer in the received signal. Sampler_out sub-signal (l) is a digitized version of the analog output of substrate noise sensor 1201. The interference falling into the desired signal may thus be digitally reconstructed in interference reconstruction unit 1255 by multiplying the inputs to the interference reconstruction unit 1255. In alternative exemplary embodiments (not shown), sub-signal (b) may replace sub-signal (a), while sub-signal (k) may replace sub-signal (l), with the appropriate modifications.

Note while FIGS. 12A-12D depict the exemplary embodiments of the present disclosure directed towards substrate noise, one of ordinary skill in the art will realize that the techniques disclosed herein may be applied to address the effects of any type of noise. In particular, noise that is time-varying in format and/or intensity may be dynamically sampled by a noise sensor such as the substrate noise sensor 1201, and processed according to the exemplary embodiments of FIGS. 12B-12D to digitally reconstruct the interference.

One of ordinary skill in the art will appreciate that due to the flexibility of the interference mitigation architecture disclosed, any or all of the interference sensor and sampler 200, interference reconstruction unit 220, and processing control unit 230 may be dynamically configured to address different types of interference in the received signal depending on the conditions of signal reception. For example, the blocks may be alternately configured to mitigate a first type of interference (such as IM3 mixing of two strong out-of-band jammers, one of which can be the device's own transmitter) when such first type of interference is detected, and to mitigate a second type of interference (such as IM2) for processing when such second type of interference is detected. In an exemplary embodiment, the control signal 240a provided by interference control unit 240 may specify which type of interference is to be mitigated.

The techniques described herein may provide certain advantages. First, analog circuit blocks (e.g., mixer 142) may be calibrated on-the-fly, i.e., during normal operation, using, e.g., interference control unit 240 depicted in FIG. 2, which may result in cost saving by not performing factory calibration. Furthermore, on-the-fly calibration may be able to account for variations over temperature, power supply, etc. Second, improved performance may be achieved by mitigating IM2, IM3, and/or other types of interference or distortion, as described above. Third, the techniques may allow for omission of external analog filters in the receiver (e.g., after LNA 140) and/or allow for use of analog circuitry (e.g., mixer 142) designed with less stringent intermodulation specifications, which may reduce cost and lower power consumption.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An interference mitigation apparatus, the apparatus configured to process a received signal to recover information, the apparatus comprising:
   a low-noise amplifier configured to amplify the received signal;
   a mixer coupled to the low-noise amplifier and configured to mix the amplified received signal with a secondary local oscillator signal;
   an analog-to-digital converter coupled to the mixer and configured to digitize the mixed amplified received signal to generate a digital signal;
   an interference sensor and sampler for sensing and sampling a first interference signal to generate a first sub-signal;
   a digital rotator for rotating the first sub-signal by a rotation frequency to generate a digital reconstructed interference signal;
   a correlator for correlating the digital reconstructed interference signal with the digital signal derived from the received signal; and
   an interference control unit for controlling an adjustment to the processing of the received signal based on the digital reconstructed interference signal to mitigate interference in the received signal.

2. The apparatus of claim 1, further comprising a searcher configured to:
   rotate the first sub-signal by a plurality of candidate rotation frequencies;
   correlate each of the rotated first sub-signals with a processed version of the received signal; and
   set the rotation frequency in the digital rotator to be a candidate rotation frequency associated with a greatest result of the correlation of each of the rotated first sub-signals with a processed version of the received signal.

3. The apparatus of claim 1, the rotation frequency comprising a difference between the RX local oscillator signal frequency and a frequency associated with a spur of the RX local oscillator.

4. A method for mitigating interference in a received signal, the method comprising:
   amplifying the received signal via a low-noise amplifier;
   processing the received signal to recover information;
   mixing the amplified received signal with a secondary local oscillator signal via a mixer coupled to the low-noise amplifier;
   digitizing the mixed amplified received signal to generate a digital signal via an analog-to-digital converter coupled to the mixer;
   sensing an interference signal;
   sampling the sensed interference signal to generate a first sub-signal;
   digitally rotating the first sub-signal by a rotation frequency to generate a digital reconstructed interference signal;
   correlating the digital reconstructed interference signal with the digital signal derived from the received signal; and
   adjusting the processing the received signal based on the digital reconstructed interference signal to mitigate interference in the received signal.

5. The method of claim 4, the rotation frequency comprising a difference between the RX local oscillator signal frequency and a frequency associated with a spur of the RX local oscillator.

6. The method of claim 4, further comprising:
   rotating the first sub-signal by a plurality of candidate rotation frequencies;
   correlating each of the rotated first sub-signals with a processed version of the received signal; and
   setting the rotation frequency in the digitally rotating step to be a candidate rotation frequency associated with a greatest result of the correlating each of the rotated first sub-signals with the processed version of the received signal.

7. An interference mitigation apparatus, the apparatus configured to process a received signal to recover information, the apparatus comprising:
   means for amplifying the received signal with a low-noise amplifier;
   means for processing the received signal to recover information;
   means for mixing the amplified received signal with a secondary local oscillator signal;
   means for digitizing the mixed amplified received signal to generate a digital signal;
   means for sensing an interference signal;
   means for sampling the sensed interference signal to generate a first sub-signal;
   means for digitally rotating the first sub-signal by a rotation frequency to generate a digital reconstructed interference signal;
   means for correlating the digital reconstructed interference signal with the digital signal derived from the received signal; and
   means for adjusting the processing the received signal based on the digital reconstructed interference signal to mitigate interference in the received signal.

8. The apparatus of claim 7, the rotation frequency comprising a difference between the RX local oscillator signal frequency and a frequency associated with a spur of the RX local oscillator.

9. The apparatus of claim 7, further comprising:
means for rotating the first sub-signal by a plurality of candidate rotation frequencies;
means for correlating each of the rotated first sub-signals with a processed version of the received signal; and
means for setting the rotation frequency in the digitally rotating step to be a candidate rotation frequency associated with a greatest result of the correlating each of the rotated first sub-signals with the processed version of the received signal.

10. An interference mitigation apparatus, the apparatus configured to process a received signal to recover information, the apparatus comprising:
a low-noise amplifier configured to amplify the received signal;
a mixer coupled to the low-noise amplifier and configured to mix the amplified received signal with a secondary local oscillator signal;
an analog-to-digital converter coupled to the mixer and configured to digitize the mixed amplified received signal to generate a digital signal;
an interference sensor and sampler for sensing and sampling a first interference signal to generate a digital sampled interference signal;
an interference reconstruction unit for generating a digital reconstructed interference signal based on the digital sampled interference signal;
a correlator for correlating the digital reconstructed interference signal with the digital signal derived from the received signal; and
an interference control unit for controlling an adjustment to a parameter of a radio-frequency (RF) circuit block used to process the received signal based on the output of the correlator.

11. The apparatus of claim 10, the first interference signal comprising a digital transmit signal generated by a transmitter, the digital sampled interference signal being the first interference signal.

12. The apparatus of claim 10, the interference control unit being configured to control the symmetry of a mixer used to mix a local oscillator signal with the received signal to reduce the output of the correlator.

13. The apparatus of claim 10, the interference construction unit being configured to reconstruct a second-order intermodulation product (IM2) based on the digital sampled interference signal.

14. The apparatus of claim 10, the interference control unit being configured to adjust a linearity mode of a low-noise amplifier used to process the received signal to reduce the result of said correlating.

15. A method for mitigating interference in a received signal, the method comprising:
amplifying the received signal with a low-noise amplifier;
processing the received signal to recover information;
mixing the amplified received signal with a secondary local oscillator signal; and
digitizing the mixed amplified received signal to generate the first sub-signal;
sensing an interference signal;
sampling the sensed interference signal to generate a digital sampled interference signal;
generating a digital reconstructed interference signal based on the digital sampled interference signal;
correlating the digital reconstructed interference signal with the digital signal derived from the received signal; and
adjusting, based on the result of said correlating, a parameter of a radio-frequency (RF) circuit block used to process the received signal.

16. The method of claim 15, the sensing an interference signal comprising sensing a digital transmit signal generated by a transmitter, the sampling the sensed interference signal comprising providing the sensed digital interference signal as the digital sampled interference signal.

17. The method of claim 15, the adjusting a parameter comprising adjusting the symmetry of a mixer used to mix a local oscillator signal with the received signal to reduce the result of said correlating.

18. The method of claim 15, the generating a digital reconstructed interference signal comprising reconstructing a second-order intermodulation product (IM2) based on the digital sampled interference signal.

19. The method of claim 15, the adjusting a parameter comprising adjusting a linearity mode of a low-noise amplifier used to process the received signal to reduce the result of said correlating.

20. An apparatus for mitigating interference in a received signal, the apparatus comprising:
means for amplifying the received signal with a low-noise amplifier;
means for processing the received signal to recover information;
means for mixing the amplified received signal with a secondary local oscillator signal;
means for digitizing the mixed amplified received signal to generate the first sub-signal;
means for sensing an interference signal;
means for sampling the sensed interference signal to generate a digital sampled interference signal;
means for generating a digital reconstructed interference signal based on the digital sampled interference signal;
means for correlating the digital reconstructed interference signal with a digital signal derived from the received signal; and
means for adjusting, based on the result of said correlating, a parameter of a radio-frequency (RF) circuit block used to process the received signal.

21. An interference mitigation apparatus, the apparatus configured to process a received signal to recover information, the apparatus comprising:
a low-noise amplifier for amplifying the received signal;
a first interference sensor and sampler for sensing and sampling a first interference signal to generate a first sub-signal, the first interference sensor and sampler comprising:
a mixer for mixing the amplified received signal with a secondary local oscillator signal; and
an analog-to-digital converter for digitizing the mixed amplified received signal to generate the first sub-signal;
an interference reconstruction unit for generating a first digital reconstructed interference signal based on the first sub-signal;
an interference control unit for controlling an adjustment to the processing of the received signal based on the first digital reconstructed interference signal to mitigate interference in the received signal; and
a second interference sensor and sampler for sensing and sampling a second interference signal to generate a second sub-signal;
the interference reconstruction unit further configured to generate a second digital reconstructed interference signal based on the second sub-signal; and the interference control unit further configured to, in response to an interference selection control signal, control an adjustment to the processing of the received signal based on the second digital reconstructed interference signal to mitigate interference in the received signal.

22. The apparatus of claim 21, further comprising:
a correlator for correlating the first or second digital reconstructed interference signal with a digital signal derived from the received signal; and
the adjustment to the processing of the received signal being based on the output of the correlator.

23. The apparatus of claim 21, the adjustment to the processing of the received signal comprising an adjustment of a parameter of a radio-frequency (RF) circuit block used to process the received signal.

24. A non-transitory computer-readable storage medium having stored thereon processor-executable instructions configured to cause a processor of an interference mitigation apparatus to mitigate interference in a received signal by performing operations comprising:
amplifying the received signal;
processing the received signal to recover information;
mixing the amplified received signal with a secondary local oscillator signal;
digitizing the mixed amplified received signal to generate a digital signal;
sensing an interference signal;
sampling the sensed interference signal to generate a first sub-signal;
digitally rotating the first sub-signal by a rotation frequency to generate a digital reconstructed interference signal;
correlating the digital reconstructed interference signal with a digital signal derived from the received signal; and
adjusting the processing the received signal based on the digital reconstructed interference signal to mitigate interference in the received signal.

25. The non-transitory computer-readable medium of claim 24, wherein the stored processor-executable instructions are configured to cause a processor of an interference mitigation apparatus to mitigate interference in a received signal by performing operations such that digitally rotating the first sub-signal by a rotation frequency comprises digitally rotating the first sub-signal by a rotation frequency comprising a difference between the RX local oscillator signal frequency and a frequency associated with a spur of the RX local oscillator.

26. The non-transitory computer-readable medium of claim 24, wherein the stored processor-executable instructions are configured to cause a processor of an interference mitigation apparatus to mitigate interference in a received signal by performing operations further comprising:
rotating the first sub-signal by a plurality of candidate rotation frequencies;
correlating each of the rotated first sub-signals with a processed version of the received signal; and
setting the rotation frequency in the digitally rotating step to be a candidate rotation frequency associated with a greatest result of the correlating each of the rotated first sub-signals with the processed version of the received signal.

27. A non-transitory computer-readable storage medium having stored thereon processor-executable instructions configured to cause a processor of an interference mitigation apparatus to mitigate interference in a received signal by performing operations comprising:
amplifying the received signal with a low-noise amplifier;
processing the received signal to recover information;
mixing the amplified received signal with a secondary local oscillator signal; and
digitizing the mixed amplified received signal to generate the first sub-signal;
sensing an interference signal;
sampling the sensed interference signal to generate a digital sampled interference signal;
generating a digital reconstructed interference signal based on the digital sampled interference signal;
correlating the digital reconstructed interference signal with the digital signal derived from the received signal; and
adjusting, based on the result of said correlating, a parameter of a radio-frequency (RF) circuit block used to process the received signal.

28. The non-transitory computer-readable medium of claim 27, wherein the stored processor-executable instructions are configured to cause a processor of an interference mitigation apparatus to mitigate interference in a received signal by performing operations such that sensing an interference signal comprises sensing a digital transmit signal generated by a transmitter, and sampling the sensed interference signal comprises providing the sensed digital interference signal as the digital sampled interference signal.

29. The non-transitory computer-readable medium of claim 27, wherein the stored processor-executable instructions are configured to cause a processor of an interference mitigation apparatus to mitigate interference in a received signal by performing operations such that adjusting a parameter comprises adjusting the symmetry of a mixer used to mix a local oscillator signal with the received signal to reduce the result of said correlating.

30. The non-transitory computer-readable medium of claim 27, wherein the stored processor-executable instructions are configured to cause a processor of an interference mitigation apparatus to mitigate interference in a received signal by performing operations such that generating a digital reconstructed interference signal comprises reconstructing a second-order intermodulation product (IM2) based on the digital sampled interference signal.

31. The non-transitory computer-readable medium of claim 27, wherein the stored processor-executable instructions are configured to cause a processor of an interference mitigation apparatus to mitigate interference in a received signal by performing operations such that adjusting a parameter comprises adjusting a linearity mode of a low-noise amplifier used to process the received signal to reduce the result of said correlating.

* * * * *